United States Patent [19]

Kurome et al.

[11] Patent Number: 4,614,153
[45] Date of Patent: Sep. 30, 1986

[54] JUICE EXTRACTOR

[75] Inventors: Shosaku Kurome; Tokio Akai; Takahiro Maeda, all of Hyogo, Japan

[73] Assignee: Sanyo Electric Co., Ltd., Japan

[21] Appl. No.: 688,305

[22] Filed: Jan. 2, 1985

[30] Foreign Application Priority Data

Jan. 17, 1984 [JP] Japan .................................. 59-6914
Dec. 14, 1984 [JP] Japan .............................. 59-264929

[51] Int. Cl.$^4$ ............................................. A23N 1/00
[52] U.S. Cl. ........................................ 99/511; 99/513
[58] Field of Search .................... 99/509–513, 99/456, 458, 495, 503, 501; 100/116, 125, 156; 241/277, 278 R, 279–280; 210/280, 372–376, 369–371

[56] References Cited

U.S. PATENT DOCUMENTS 4,345,517  8/1982  Arao et al. ........................... 99/511

FOREIGN PATENT DOCUMENTS 0006240  1/1980  European Pat. Off. .............. 99/511
1097099  1/1961  Fed. Rep. of Germany ........ 99/512
1203327  1/1980  France .................................. 99/511

Primary Examiner—Timothy F. Simone
Attorney, Agent, or Firm—Darby & Darby

[57] ABSTRACT

A juice extractor comprises a centrifugal separator cylinder (29) rotatably driven by a motor, a cylindrical filter (30) and a lid (61). The cylindrical filter (30) is structured by a spiral body axially expandable and having spiral juice flowing spacings or gaps (69). The cylindrical filter (30) is engaged between a lower surface of the lid (61) and an inner bottom surface of the centrifugal separator cylinder (29) and an outer peripheral surface of the lid (61) is engaged with an inner peripheral surface of the centrifugal separator cylinder (29). As a result, the cylindrical filter (30) is prevented from being axially expanded, and the relative rotation between the cylindrical filter (30) and the centrifugal separator cylinder (29) is prevented. In addition, a juice flowing spacing (58) is formed between the outer peripheral surface of the cylindrical filter (30) and the inner peripheral surface of the centrifugal separator cylinder (29). The cylindrical filter (30) is integrally formed with the lid (61) and a rotatable handle (113) is provided on the lid (61).

27 Claims, 56 Drawing Figures

FIG.11
(A)
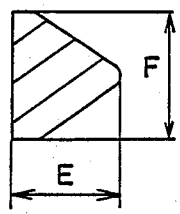
(B)
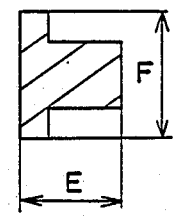
(C)
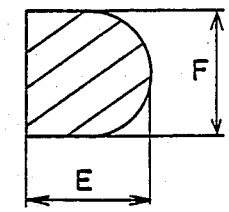
(D)
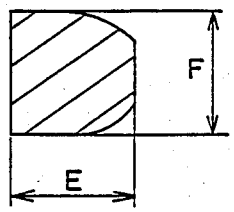
(E)
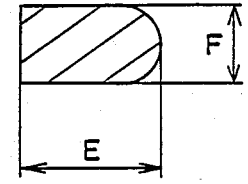
(F)
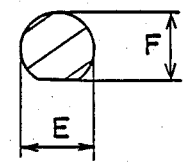
(G)
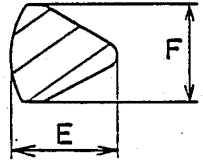
(H)
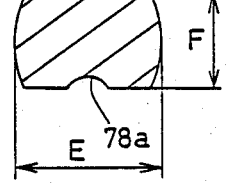
(I)
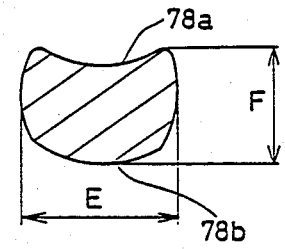

JUICE EXTRACTOR

BACKGROUND OF THE INVENTION

1. Field of the Invention

The present invention relates to a juice extractor and, more particularly, it relates to an improved juicer comprising a centrifugal separator cylinder having in an inner bottom portion a cutter or abrader plate for abrading or disintegrating materials. The cylinder is rotatably driven by a motor, and a cylindrical filter is removably mounted in an inner periphery of the centrifugal separator cylinder for separating juice and residue from the abraded or cut material, so that the residue can be left in the cylindrical filter.

2. Description of the Prior Art

A juice extractor or a juicer conprising a centrifugal separator cylinder and a cylindrical filter so that residue from abraded material can be left in the cylindrical filter is disclosed in the Japanese Utility Model Publication No. 10504/1983, for example. A filter used in such type of juicer is formed in a comb-like shape for forming a number of juice flowing slits longitudinally, so that the residue sticks to and is stored in an inner peripheral surface of the filter when the separator is being rotatably driven. After the juicer is used, the cylindrical filter should be elastically deformed so as to take off such a sticking residue. The change of spacings between the slits due to such deformation is relatively larger in a lower portion of the slits and is relatively smaller in an upper portion. Therefore, it is not so efficient to take off the residue and hence the residue cannot be completely taken off simply by washing in water. Therefore, it has been usual to use a brush and the like so as to completely take off the residue. Such difficulty in taking off residue is the most serious cause making a user hesitate to use a juicer itself.

SUMMARY OF THE INVENTION

Briefly stated, the present invention comprises a juice extractor including a base having a motor, a vessel supported on the base, a centrifugal separator cylinder having in an inner bottom portion thereof a cutter for cutting or abrading materials the cylinder being rotatably driven by the motor disposed in the vessel, and a cylindrical filter removably mounted in the inner periphery of the centrifugal separator cylinder for separating a juice and the residue from the abraded material so that the residue can be left in the inner portion thereof, the cylindrical filter being structured by a spiral body axially expandable and having a juice flowing spiral spacing. Accordingly, according to the present invention, the size of the juice flowing spacing can be greatly changed by axially expanding the cylindrical filter or deforming or shifting it in a direction perpendicular to an axial direction thereof.

In accordance with another aspect of the present invention, a juice extractor of the present invention further comprises filter pressing means for pressing the cylindrical filter from the upper portion thereof so as to prevent the cylindrical filter from axially expanding and rotation preventing means for preventing a relative rotation of the cylindrical filter and the centrifugal separator cylinder at least during an ordinary rotation of the centrifugal separator cylinder.

Accordingly, when the centrifugal cylinder is rotatably driven, the cylindrical filter cannot be axially expanded and the cylindrical filter cannot be rotated in a direction opposite to a rotating direction of the centrifugal cylinder by inertia.

Furthermore, in accordance with other aspects of the present invention, the filter pressing means is integrally formed with the cylindrical filter at the top portion of the cylindrical filter and is provided with a rotatable or movable handle.

Accordingly, a primary object of the present invention is to provide a juice extractor or a juicer which is convenient in use and in which, after use, a residue can be easily taken off.

A primary advantage of the present invention is that the residue can be easily taken off by making a juice flowing spacing of the cylindrical filter larger by axial expansion of the cylindrical filter or deformation of the filter in a direction perpendicular to an axial direction or deformation of the filter in a rotational direction.

Another advantage of the present invention is that the residue sticking to the spacing can be easily washed out by washing the cylindrical filter with the juice flowing spacing of the filter expanded.

A further advantage of the present invention is that a cylindrical filter never protrudes from the vessel or flies out while the centrifugal separator cylinder is being rotatably driven.

A still further advantage of the present invention is that the cylindrical filter can be prevented from rotating in an opposite direction due to inertia while the centrifugal separator cylinder is being rotatably driven.

A still further advantage of the present invention is that mounting and clamping of the filter pressing means can be necessarily achieved in use because of an integral formation of filter pressing means and cylindrical filter.

A still further advantage of the present invention is that a movable or rotatable handle provided on the top portion of the cylindrical filter allows a user to easily handle the filter.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing various shapes of cross section of a spiral body of the cylindrical filter;

FIG. 36 is a side view of an essential part showing the state where the restricting piece is fitted into the engaging groove of the centrifugal separator cylinder;

FIGS. 47 and 48 are side views of essential part of the cylindrical filter of another embodiment of the present invention.

DESCRIPTION OF THE PREFERRED EMBODIMENTS

Figure 1:
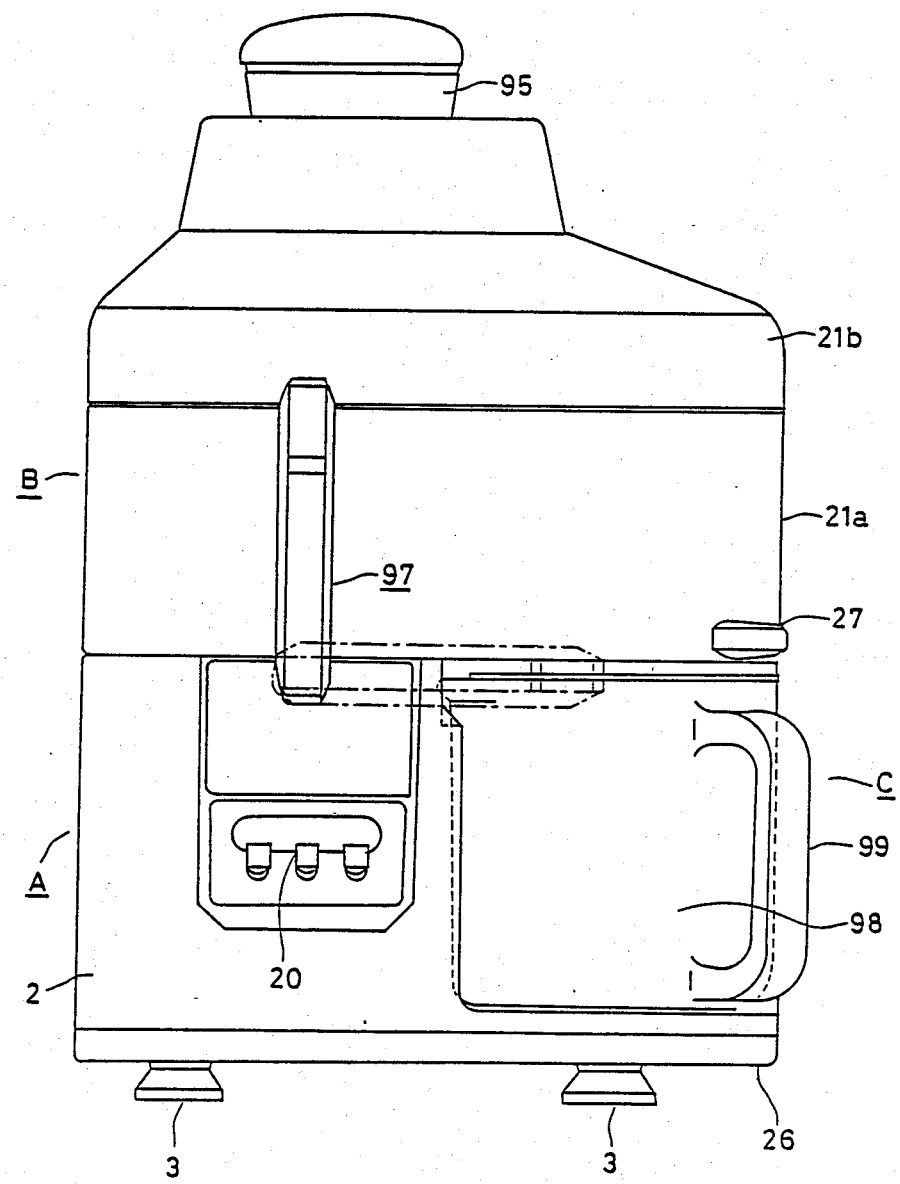
FIG. 1 is a front view of a juicer of an embodiment of the present invention.

FIG. 1 is a drawing showing an overview of a juicer or a juice extractor of an embodiment of the present invention.

First, a structure of the embodiment of the present invention as shown in FIG. 1 will be schematically described in the following. The juicer as shown in FIG. 1 is of a residue or waste collecting type which can also serve as a mixer by coupling a mixer attachment (not shown). The juicer comprises a body portion A containing a motor (not shown) and so on, a juice producing portion B having a centrifugal separator cylinder as described subsequently, and a juice receiving and discharging portion C for receiving and discharging a juice produced by the juice producing portion B.

Figure 2:
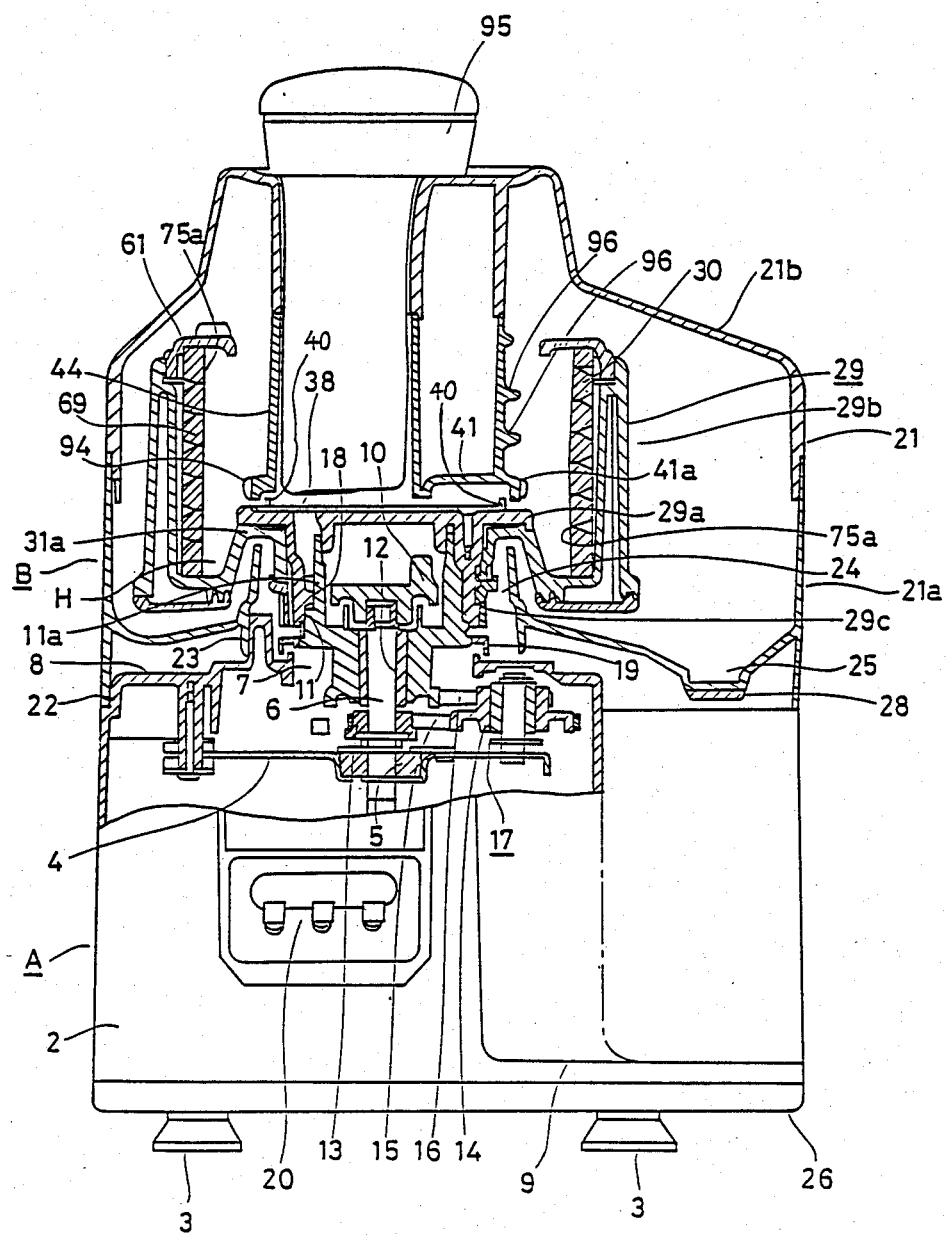
FIG. 2 is a cross sectional view of an essential part of the juicer shown in FIG. 1.

FIG. 2 is a cross sectional view of an essential part of the juicer shown in FIG. 1. Referring to FIG. 2, the structure of the body portion A will be described in detail. A lower casing 2 has a rectangular shape in section with four corners rounded and has flexible legs 3 in a lower surface at the four corners. In addition, the lower casing 2 is provided with a motor (not shown) supported by a supporting plate 4 in a depending manner and is also provided with a driving shaft 6 of the motor rotatably beared by a bearing 5, the driving shaft 6 projecting upwardly from an upper surface opening 7 of the lower casing 2. The lower casing 2 has a higher stepped portion 8 and a lower stepped portion 9 in the upper surface thereof. A high-speed driving connector 10 is secured to an upper end of the motor driving shaft 6, so that the connector can be detachably coupled to a connector (not shown) disposed in a lower surface of a mixer attachment (not shown). In addition, a low-speed driving connector 11 is rotatably supported to the driving shaft 6 by a bearing 12, so that rotation of the driving shaft 6 is transmitted to the connector 11 in a reduced manner through a reduction mechanism 17 comprising pulleys 13, 14, belts 15, 16 and the like and the connector 11 is rotated at a low speed in an outer periphery of the connector 10 in a manner concentric with the high-speed driving connector 10.

The low-speed driving connector 11 is formed with a larger-diameter-portion 11a in an upper portion thereof, the larger-diameter-portion 11a being provided with an engaging groove 18 in an outer periphery thereof and having a plate 19 for swishing water off mounted in the lower end thereof. A manipulating portion 20 for motor control is provided in a front surface of the lower casing 2.

Now, the structure of the juice producing portion B will be described in detail. Referring to FIG. 2, a vessel 21 comprises a receiving container 21a with an opening in its upper portion and a covering lid 21b for covering the upper opening and has a rectangular shape in plane with four corners being notched so as to mate with the shape of the lower casing 2. The receiving container 21a is fitted to fitting portions 22 and 23 formed in the higher stepped portion 8 in the upper surface of the lower casing 2 so as to be removably seated on the lower casing 2, and has an opening 24 into which the connectors 10 and 11 are inserted. In addition, the container 21a is formed with a juice discharging outlet 25 in the position opposing to the lower stepped portion 9 of the lower casing 2. The juice discharging outlet 25 is provided, as shown in FIGS. 1 and 2, with a valve 28 opened or closed by a knob 27 positioned in a notch portion 26 provided in a right front corner of the vessel 21a.

The centrifugal separator cylinder 29 is removably coupled to the above described low-speed driving connector 11 to be rotatably driven. A spiral filter 30 is detachably mounted in an internal periphery of the cylinder 29. The centrifugal separator cylinder 29 comprises a base portion 29a provided in an upper surface of a cutter 38 for cutting materials, a generally cylindrical portion 29b with a bottom removably mounted to the base portion 29a, and a ring body 29c for coupling the base portion 29a and the cylindrical portion 29b.

Figure 3:
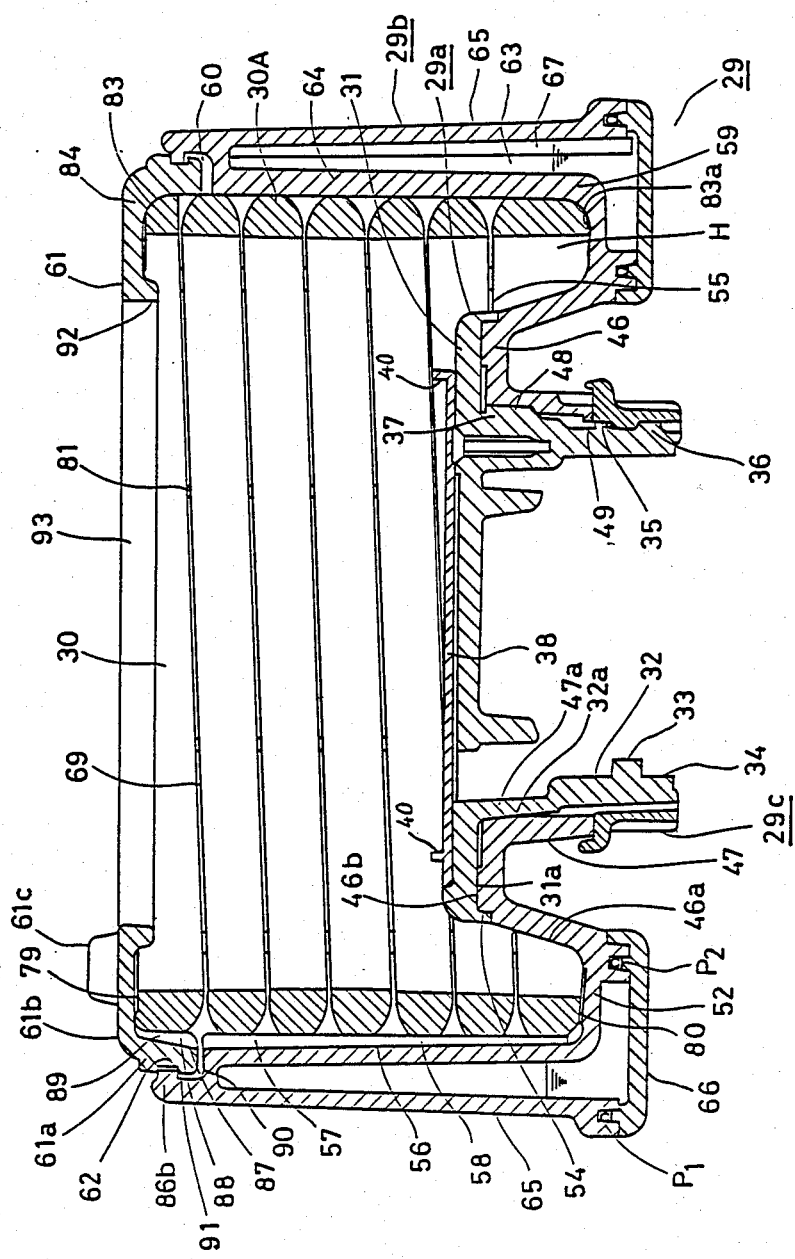
FIG. 3 is an enlarged cross sectional view of a centrifugal separator cylinder and cylindrical filter of the juicer shown in FIG. 2.
Figure 4:
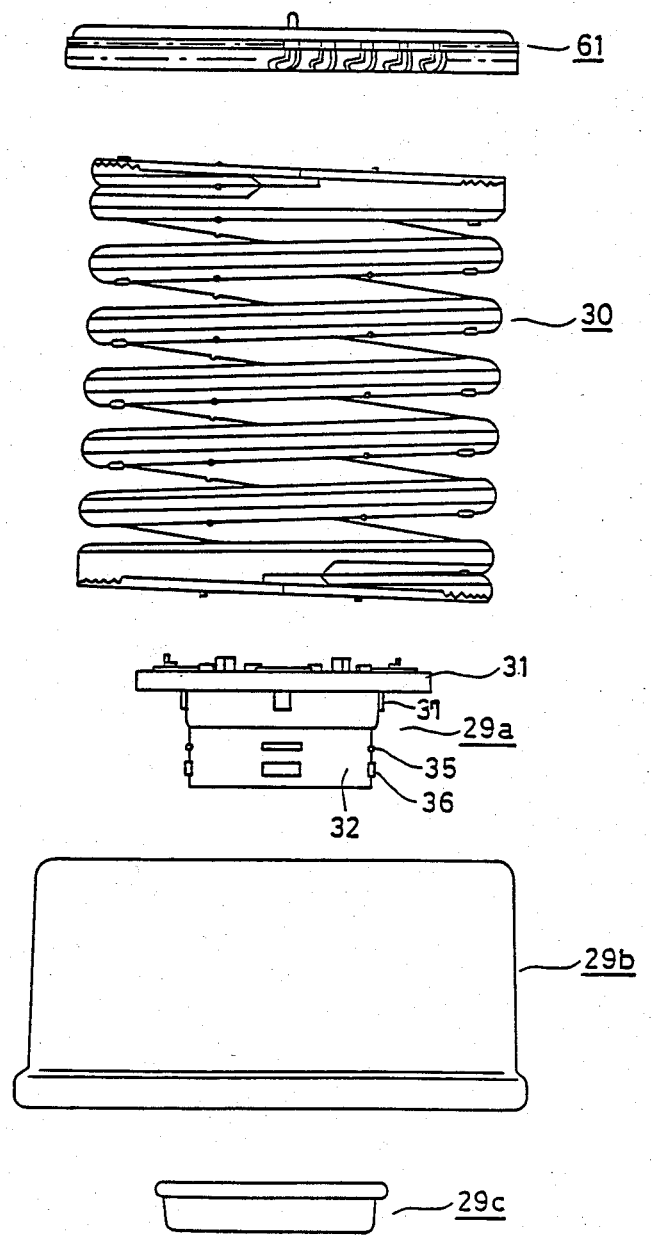
FIG. 4 is an exploded view of the centrifugal separator cylinder and cylindrical filter shown in FIG. 3.

FIG. 3 is an enlarged cross sectional view of the centrifugal separator cylinder 29 shown in FIG. 2 and FIG. 4 is an exploded perspective view. Referring to FIGS. 3 and 4, the structure of the centrifugal separator cylinder 29 will be described in detail. The base portion 29a is made of a synthetic resin and comprises a horizontal portion 31 and a cylindrical supporting portion 32 projecting downwardly therefrom. A projection 33 formed in a lower internal periphery of the supporting portion 32 is removably engaged with a groove 18 provided in an outer periphery of the low-speed driving connector 11 and also a lower end 34 is downwardly fitted to a groove of the low-speed driving connector 11 to be detachably coupled to the connector 11. In addition, a plurality of projections 35 for tentative fixing and a plurality of projections 36 for engagement are formed in a lower outer periphery of the supporting portion 32 for engagement with the ring body 29c.

Figure 5:
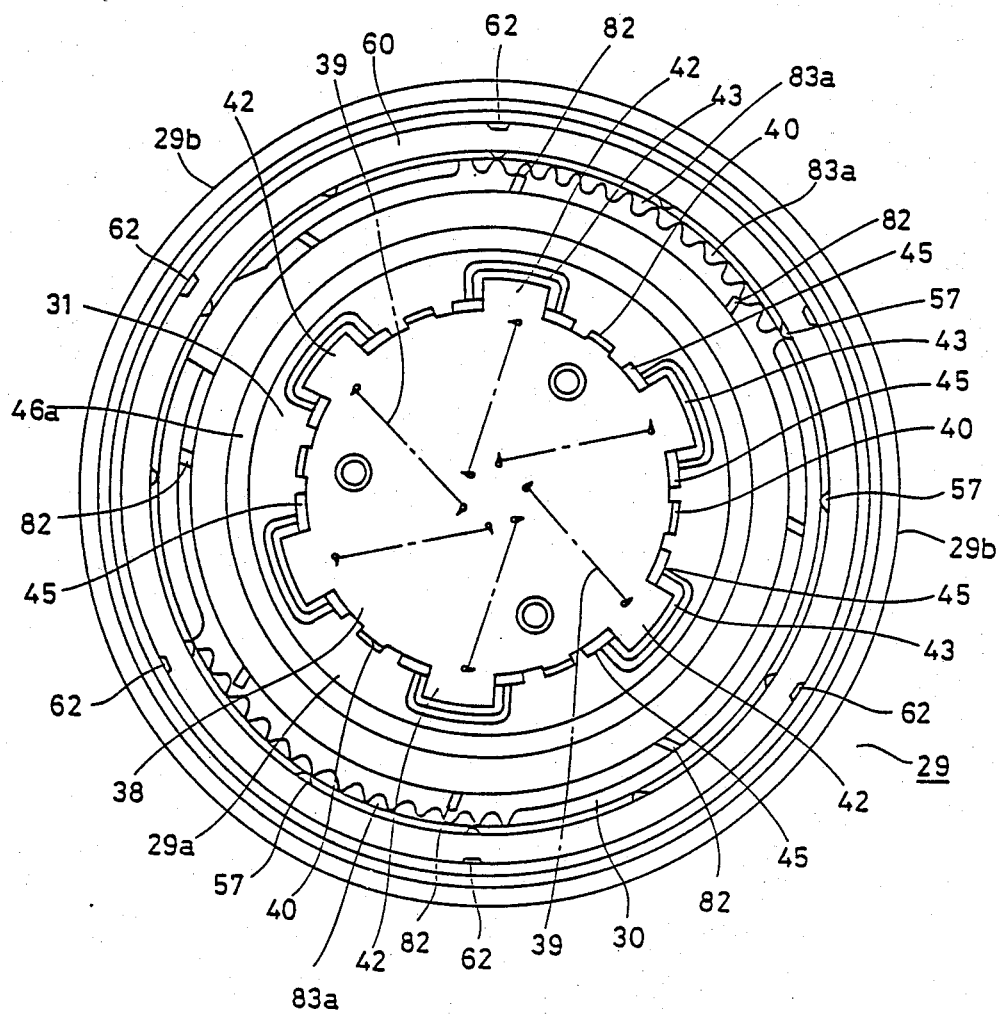
FIG. 5 is a plan view of the centrifugal separator cylinder and the cylindrical filter of an embodiment of the present invention.

FIG. 5 is a plan view of an essential part of the centrifugal separator cylinder 29. As shown in FIG. 5, a cutter 38 is attached to the horizontal portion 31 by means of a screw or calking of pin and is formed with grating edges, as cutting blade, radially from the center thereof, and a plurality of re-cutting blades 40 for re-cutting the remaining pieces of materials into smaller pieces are formed in the periphery of the cutter 38. In addition, the cutter 38 is formed with a plurality of extensions 42 in the outer edge of the cutter 38 for contacting with peripheral edges of a restricting plate 41 as described subsequently. Surrounding projections 43 are of the same level or a higher level than the height of the extension 42 so as to surround three sides of the extension 42, so that the projections 43 are projected from the horizontal portion 31, whereby a peripheral edge of a throwing-in cylinder, as described subsequently, can be protected from being cut by the edges of the extensions 42. Ribs 45 for holding material are internally projected from the horizontal portion 31 in the periphery of the cutter 38 in a discrete manner, the ribs 45 being higher than the upper surface of the grating edges 39, so that large material can be prevented from going away through a large gap between the re-cutting blades 40.

Figure 6:
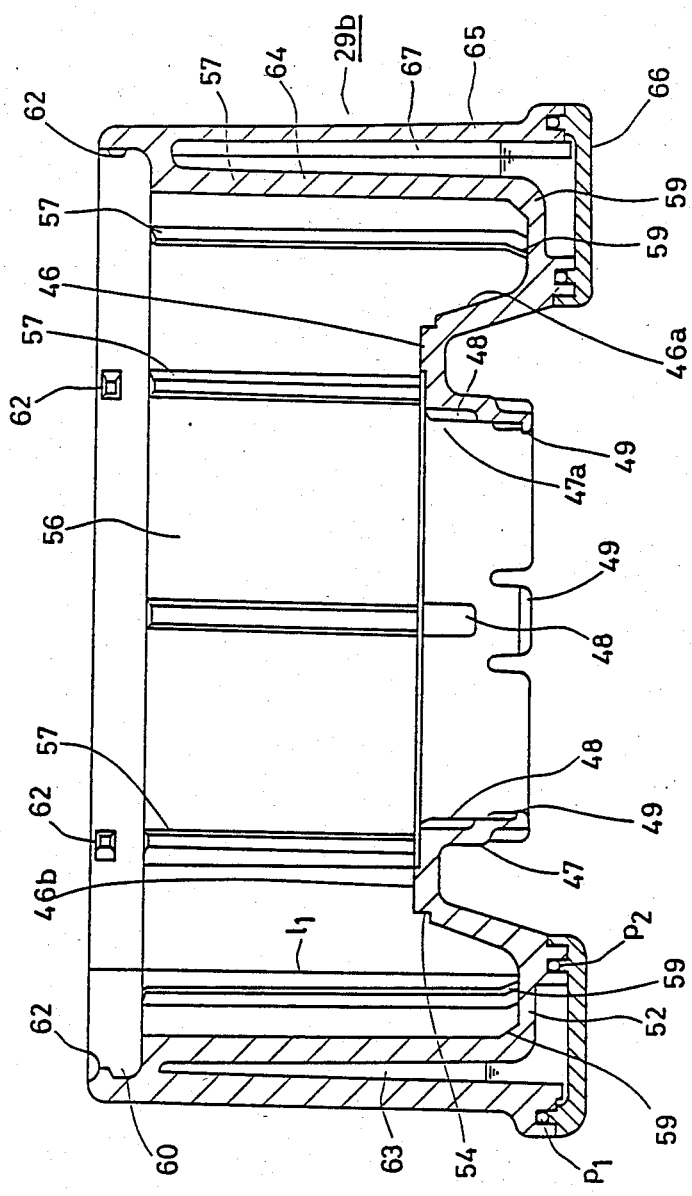
FIG. 6 is a cross sectional view of the centrifugal separtor cylinder portion of an embodiment of the present invention.

FIG. 6 is a cross sectional view of an essential part of a cylindrical portion 29b. The cylindrical portion 29b is made of a synthetic resin and, as is shown in FIG. 6, is of a cylindrical form having a bottom plate and an opening in an upper end thereof. The cylindrical portion 29b has a higher stepped portion 46 for attachment of a base portion, formed by projecting central bottom surface upwardly, and a lower stepped portion 52 for collecting the residue in the outer peripheral portion of the higher stepped portion 46. In order to facilitate separation of residue stored in the lower stepped portion 52, the outer periphery 46a of the higher stepped portion 46 is tapered to expand downwardly, and the cylindrical fitting portion 47 to which a supporting portion 32 of the base portion 29a fits is formed in a central portion. The outer periphery of the upper end 32a of the supporting portion 32 in FIG. 3 is contacted with the internal peripheral surface 47a of the upper end of the fitting portion 47 and the outer peripheral lower surface 31a of the horizontal portion 31 is contacted with the upper surface 46b of the higher stepped portion 46. Through such surface contact in terms of horizontal surface and vertical surface, the base portion 29a is securely fixed to the cylindrical portion 29b so that the supporting strength can be increased. In addition, an engaging groove 48 is formed in an upper step of an internal periphery of the fitting portion 47 and, as shown in FIG. 3, a projection 37 of the base portion 29a is fitted into the groove 48 so that the rotation of the base portion 29a and the cylindrical portion 29b can be prevented. In addition, engaging pawls 49 are discretely formed in an internal periphery of a lower end of the fitting portion 47, so that when the pawls 49 are fitted into the fitting portion 47 of the supporting 32 of the base portion 29, the pawls 49 are elastically deformed to engage with the projection 35, so that the base plate 29a is tentatively coupled to the cylindrical portion 29b.

With such a tentative coupling, a ring body 29c is fitted into an outer periphery of the supporting portion 32 of the base portion 29a, so that the cylindrical portion 29b is held by the ring body 29c and the horizontal portion 31, thereby to ensure the coupling of the base portion 29a and the cylindrical portion 29b.

Furthermore, as shown in FIGS. 3 and 6, the above described higher stepped portion 46 has a stepped portion 54 in an outer periphery thereof and the outer periphery of the horizontal portion 31 of the base portion 29a is projected downwardly so as to correspond to the stepped portion 54, so that the projected portion 55 is fitted into the stepped portion 54, whereby a juice is prevented from leaking from the gap between the horizontal portion 31 and the higher stepped portion 46 and the residue can be prevented from sticking to such gap.

Furthermore, referring to FIG. 6, an internal peripheral surface 56 of the cylindrical portion 29b mounted to the filter 30 is tapered in such a manner that a diameter is gradually increased toward an upper portion, so that the separated juice can easily rise. A plurality of longitudinal raised portions or ridges 57 are formed on the internal peripheral surface 56 with appropriate distance, so that juice flowing gap 58 is formed between the outer peripheral surface of the filter 30 and the internal peripheral surface 56 of the cylindrical portion 29b, as shown in FIG. 3. The raised portions 57 are structured such that the shape in section thereof is changed from a rectangular to generally triangular shape toward an upper portion from a lower portion, so that juice and fine cellulose can rise with ease.

Meanwhile, the juice flowing gap 58 may be provided by formation of projections in an outer periphery of the filter 30 as described subsequently, as well as formation of raised portions in an inner peripheral surface 56.

Furthermore, in FIG. 6, the projections 59 for engagement of filter are formed in a lower corner portion of the internal peripheral surface 56 to function to prevent rotation of the filter 30. Although the projections 59 are formed on an extension of the raised portion 57, it is not intended to restrict only such formation.

The projections 62 for engagement of a lid 61 described subsequently are integrally projected inwardly in the internal periphery of the above described portion 60 having relatively larger diameter.

In FIG. 6, a fluid balancer 63 is formed in a generally L shape throughout the side surface and bottom surface of the cylindrical portion 29b. The fluid balancer 63 is formed by structuring the side portion of the cylindrical portion 29b by double walls 64 and 65 with an opening in the lower surface, the opening in the lower surface being sealed by a ring-like bottom lid 66 so that a closed spaced is formed. An appropriate number of resistance plates 67 longitudinally extending are internally projected into the closed space from the outer wall 65 and an optimum quantity of liquid 68 is contained in the space. The bottom lid 66 is fixed to the cylindrical portion 29b in such a manner that the lower end of the outer wall 65 is fitted into the internal end portion of the lower surface of the bottom stepped portion 52 and welded by high frequency and sealed, so that the sealing is enhanced by such fitting. Meanwhile, P1 and P2 are metal rings used in a high frequency welding. The outer wall 65 is tapered such that the diameter of the lower portion is larger than that of the upper portion, so that the lower portion of the above described closed space is wider than that of an upper portion so that the liquid 68 is collected in the lower portion and hence the liquid is prevented from rising upwardly.

Figure 7:
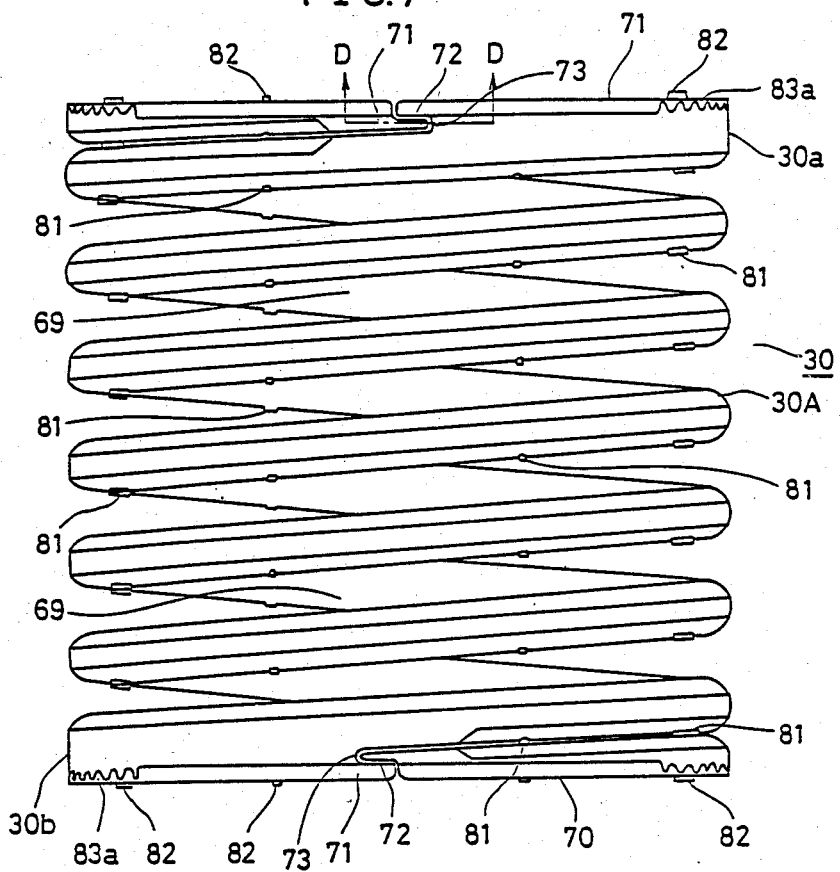
FIG. 7 is an enlarged side view of the cylindrical filter shown in FIG. 4.
Figure 8:
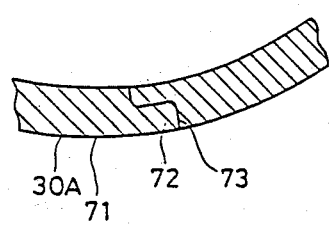
FIG. 8 is an enlarged view of the essential part of the cylindrical filter shown in FIG. 7.
Figure 9:
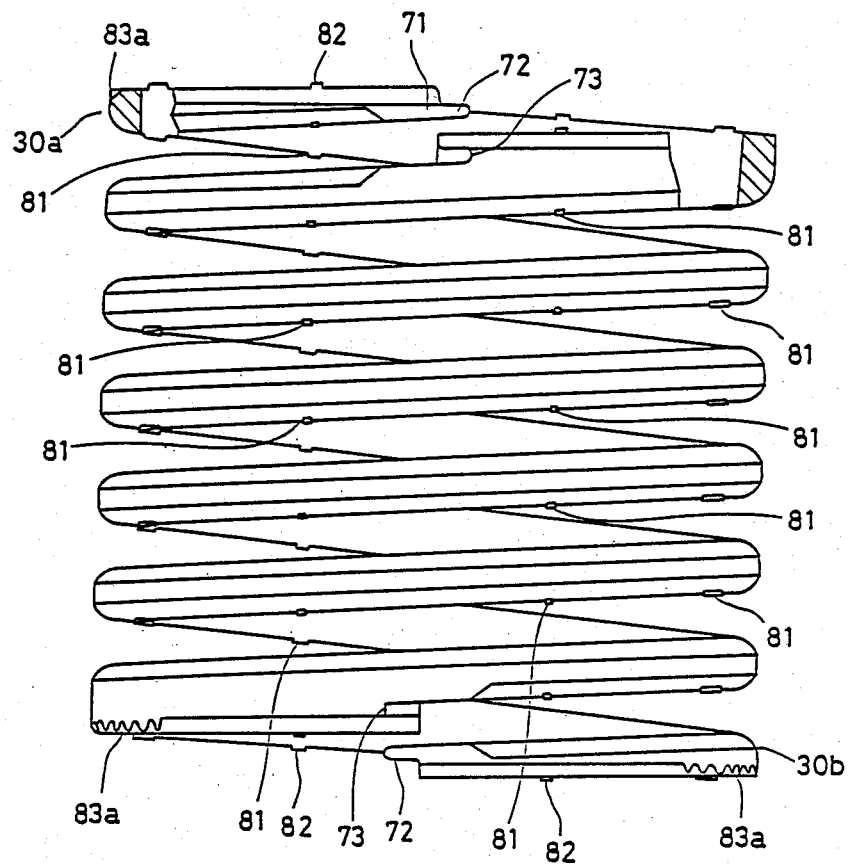
FIG. 9 is a side view showing other manner of the cylindrical filter shown in FIG. 7.
Figure 10:
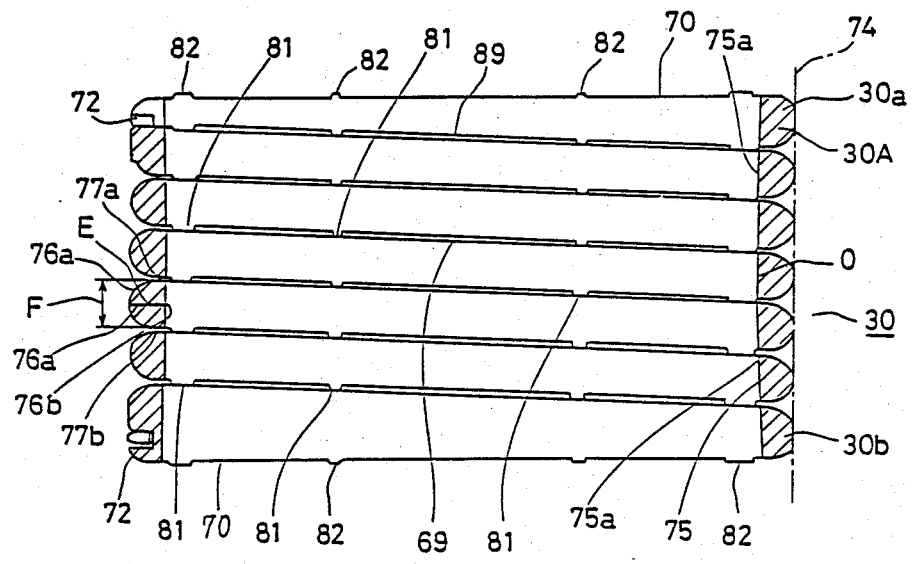
FIG. 10 is a cross sectional view of the cylindrical filter.

FIGS. 7, 8, 9 and 10 are drawings showing a spiral filter 30 of a juicer of one embodiment of the present invention. As shown in FIGS. 7 to 10, the spiral filter 30 is structured by a spiral body 30A having helix with a number of pitches, made of synthetic resin such as ABS resin. A spiral juice flowing gap 69 is formed between pitches. The filter has a nature of spring. The spiral body 30A is formed by a metal mold so that the gap 69 is in extension, as shown in FIG. 7, with the force being not exerted on the body 30A in a compression direction of the axis of the cylinder. Therefore, the gap 69 is at minimum when the lid 61 as described subsequently is sealed and hence the spiral body is compressed, and if and when force is exerted in an expansion direction from the state shown in FIG. 7, the gap 69 is expanded. In addition, if and when a force is exerted in a horizontal direction, the spiral body is shifted traversely, so that the spacings of the gap 69 can be expanded traversely. The axial length of the spiral body 30A is larger than the depth 11 of the cylindrical portion 29b both in the case where the lid 61 is sealed and in the case where the spiral 30A is in a natural state, so that the filter 30 can be easily taken out. Meanwhile, the length in the axial direction of the spiral body 30A may be formed so as to be approximately equal to the depth 11 of the cylindrical portion 29b both in case where the lid 61 is sealed and in case where the spiral 30A is in natural extension. In addition, the spiral body 30A may be structured such that the gap 69 is in minimum compression state as shown in FIG. 10 with the body 30A being seated naturally.

Furthermore, the end surfaces 70, 70 of the top stage or portion 30a and the bottom end 30b of the spiral filter 30 are structured so as to be flat without any stepped portions, so that a large gap is not formed between an internal surface of the lid 61 and the inner bottom surface of the cylindrical portion 29b, which can prevent the residue from flowing out. In order to change the height of the cross section of the spiral body, it is possible to connect a height adjusting ring-like member to upper and lower surfaces of the spiral body having identical cross sectional shape or to change the cross section by means of metal mold. The present embodiment adopts the latter approach. The end portions 71, 71 have sufficient thickness in an axial direction so as to secure strength of the end portions and, as shown in FIG. 7, projecting pieces 72 are provided with the end portions 71, 71 and grooves 73 are provided in butt surfaces corresponding to the end portions 71, 71 for fitting the projection piece 72 thereinto, so that the end portions 71, 71 having relatively small cross section cannot be subjected to damage even if a considerable force is exerted on the end portions 71, 71 when the filter 30 is pulled out. In addition, the projecting piece 72 and the groove 73 are provided with rounded portions, so that as shown in FIG. 9, the projecting pieces 72 are disengaged with the grooves 73 if and when an excessive force is exerted on the end portions 71, 71. As shown in FIG. 8, such engagement is made on an outer peripheral side of the filter 30 and hence less residue is sticked, which makes it easy to clean the filter.

The spiral body 30A is structured such that the outer diameter thereof is made somewhat smaller than that of an inner diameter (the top of the raised portion 57) of the cylindrical portion 29b and the outer peripheral surface 74 of the spiral body 30A is contacted with the raised portion 57. Furthermore, the internal peripheral surface 75 of the spiral body 30A is formed as tapered surface 75a, 75a with respect to center O, in which case the diameter becomes gradually larger upwardly and downwardly from the center O. As a result, through a rotation of the separator cylinder 29, the residue is first collected in the lower portion and taking off the residue downwardly from the filter can be made easier. In the present embodiment, the filter 30 is symmetrically formed with respect to the center O so that there is no difference between the upper direction and the lower direction of the filter 30. However, if directivity is needed, a taper surface having a diameter gradually becoming larger from the top to the bottom may be formed.

The cross sectional shape in each portion of spiral body 30A is notched, as shown in FIG. 10, in upper and lower corner 76a, 76a of the side thereof, so that the flow resistance of the juice flowing out of the gap 69 is made smaller, and the internal side surface 76b is made to be a flat surface, so that movement of the residue is made easier. However, the manner of the notched portion may be of a design such as in FIGS. 11(A) through (I) and if good movability of residue is not required, the interior side surface is formed as a curved surface as shown in FIGS. 11(F) through (I).

In addition, the spiral body 30A needs a spring tension so as not to expand when the filter is taken out and hence relatively wider sectional area is required. In the embodiment, the longitudinal width F is made longer than the lateral width E of a cross section. By setting F>E, it is restricted for the outer diameter of the filter 30 to become larger, if and when a volume of an internal space of the filter 30 is constant. However, if there is no limit of such outer diameter, F<E may be set as shown in FIGS. 11(C) through (I). In order to keep a cylindrical shape even if the filter 30 is somewhat shifted traversely, the contacting surface in each portion of the filter 30 may be formed as flat surfaces 77a, 77b or may be formed as concave surface 78a and convex surface 78b which are fitted with respect to each other, as shown in FIGS. 15(H) and (I).

Again referring to FIG. 3, the spiral body 30A is formed with a spiral juice flowing gap 69 between the respective portions thereof and with juice flowing gaps 79, 80 between the internal surface of the lid 61 and the spiral body 30A and between the upper surface of a lower stepped portion 52 of the cylindrical portion 29b and the spiral body 30A. Gap holding projections 81 are equidistantly formed in the lower surface of the spiral body 30A along the gap 69 throughout the whole of radial direction of the flat surface 77b, so that the spiral gap 69 does not become narrower than a predetermined value (for example, 0.4 mm), with the lid being closed in FIG. 3, and other gap holding projections 82 similar to the above described projections 81 are formed in the upper surface and the lower surface of the spiral body 30A in the juice flowing gap 79, 80. These projections 81, 82 ensures that juice uniformly flows out throughout all of upper and lower portions of the filter. Meanwhile, instead of provision of projections 82 in the spiral body 30A, the projections 82 may be provided on the lid 61 and cylindrical portion 29b side and the projections 81 may be provided in the upper surface of the spiral body 30A. The projections 81 and 82 may be knurling-projections.

Figure 12:
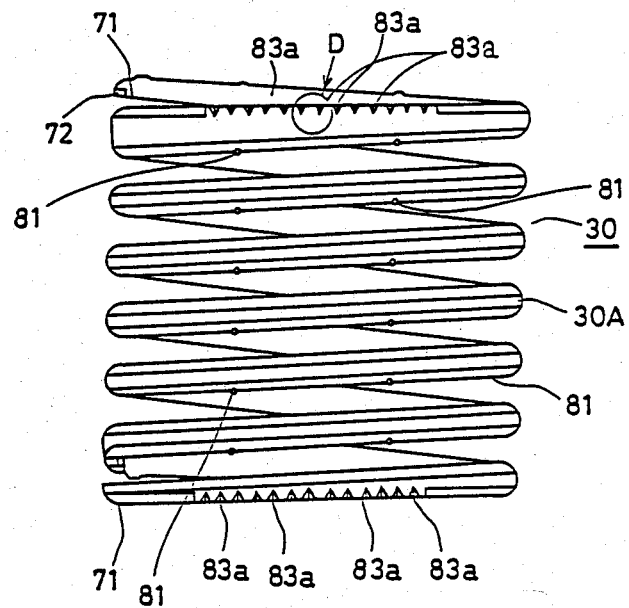
FIG. 12 is a side view of the cylindrical filter in which engaging grooves are provided in the uppermost portion and the lowest portion of the filter.
Figure 13:
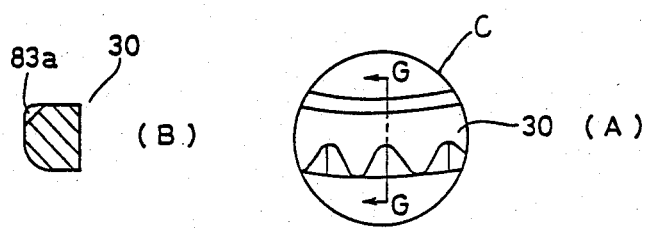
FIGS. 13 and 14 are enlarged view and cross sectional view of the essential part of the engaging grooves shown in FIG. 12.
Figure 14:
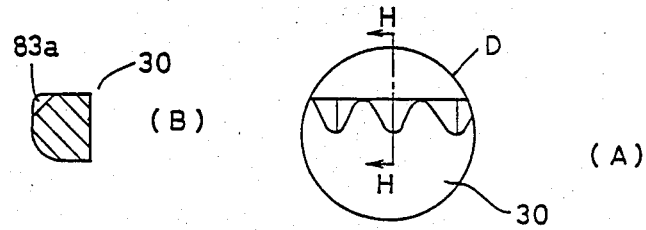

FIG. 12 is a drawing showing rotation preventing means for preventing rotation of spiral body 30A when the spiral body 30A is in engagement with the cylindrical portion 29b and the lid 61. More particularly, in the top portion and the lowest portion of the spiral body 30A, many engaging grooves 83a, 83a in "V" shape are formed in a corner portion and distributed through a predetermined angle (60° in this embodiment). A pair of such V shaped grooved portions are formed on the respective top and lowest portions. On the other hand, the V-shaped projections 84 are equidistantly formed through the predetermined angle (about 60° in this embodiment) on an internal peripheral corner portion of the lid 61. Therefore, the grooves 83a in the top portion of the spiral body 30A are fitted into the projections 84 of the lid 61 so that rotation can be prevented between the lid 61 and the spiral body 30A. On the other hand, the projections 59 of the cylindrical portion 29b are fitted into the grooves 83a in the lowest portion of the spiral body 30a, so that rotation can be prevented between the separator cylinder 29 and the spiral body 30A. Incidentally, FIG. 13(A) is a plan view of the groove 83a (a part C of FIG. 15) and FIG. 13(B) is a cross sectional view taken along the line G—G in FIG. 13(A). FIG. 14(A) is a side view of the groove 83a (a part D of FIG. 12) and FIG. 14(B) is a cross sectional view taken along with the line H—H in FIG. 14A.

Figure 15:
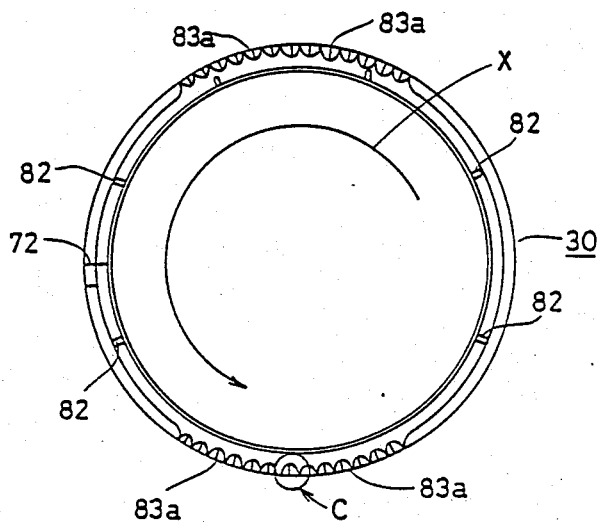
FIG. 15 is a plan view of the cylindrical filter.

FIG. 15 is a plan view of a spiral body 30A, in which the spiral body 30A is structured such that the winding direction thereof is determined as a direction that the diameter thereof expand when the spiral body is rotated in a rotating direction of the separator cylinder 29 with the lower end of the spiral body 30A being fixed. More particularly, for example, if a rotational direction of the separator cylinder 29 is counterclockwise (X) as seen from an upper position, the winding direction of the spiral body 30A from up to down is clockwise as seen from the top. If the winding direction is reversed, the diameter of the spiral body 30A is reduced as the separator cylinder 29 is rotated, and at the same time, a force is exerted on the spiral body 30A in a direction in which an axial length expands. Such force tends to disengage the lid 61 with the separator cylinder 29, and, depending on the situation, the engaged portion of the lid 61 and the separator cylinder 29 may be damaged so that the lid 61 can be flew out. However, in accordance with the present embodiment, rotation of the separator cylinder 29 expands the diameter of the spiral body 30A and hence a force is exerted in a direction in which the axial length is reduced. As a result, the above described defect can be eliminated and the structure of engagement of the lid 61 can be made easier.

Figure 16:
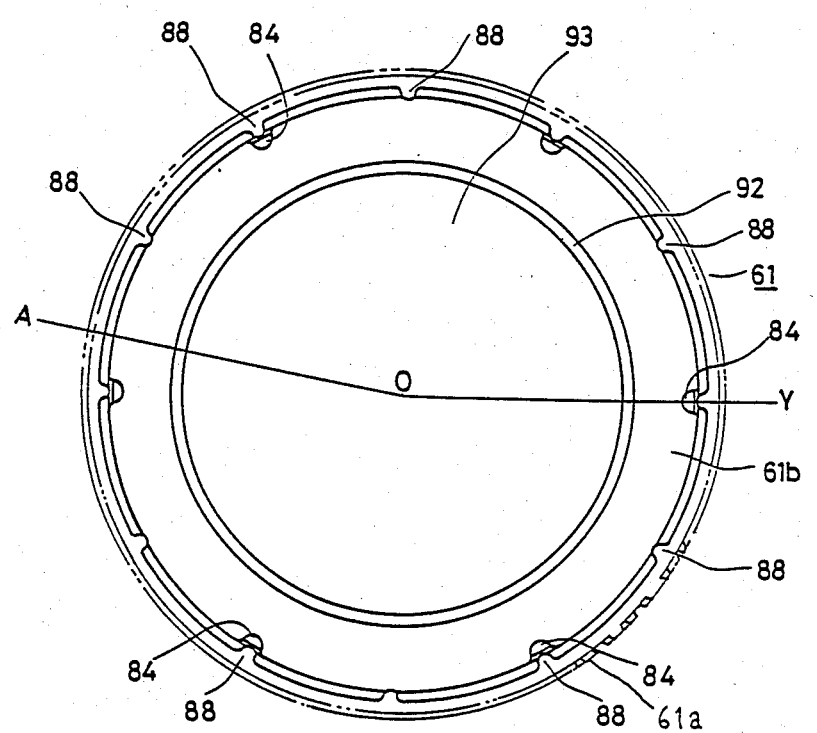
FIG. 16 is a diagram showing a rear surface of a lid for pressing the cylindrical filter.
Figure 17:
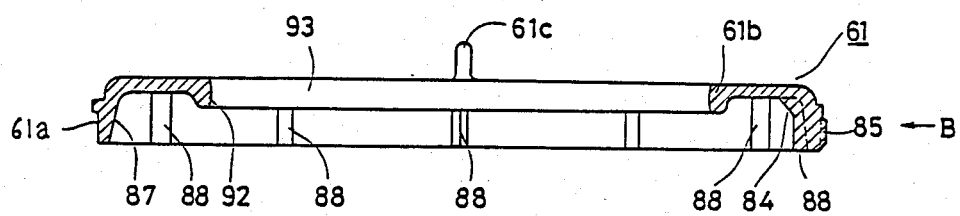
FIG. 17 is a cross sectional view taken along the line A—O—Y of the lid shown in FIG. 16.
Figure 18:
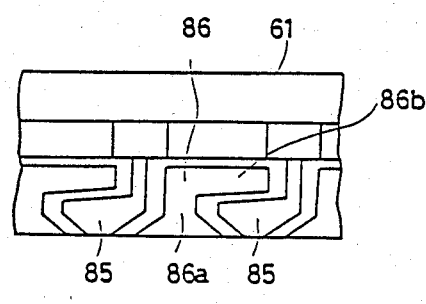
FIG. 18 is an enlarged view of the essential part as viewed from an arrow B of the lid shown in FIG. 17.

In addition, as shown in FIGS. 3, 16, 17 and 18, the lid 61 is fitted into and engaged with an upper portion 60 having a larger diameter of the cylindrical portion 29b, so that the filter 30 can be prevented from escaping and the residue collected in the internal periphery of the filter 30 can be prevented from flying out. A cylindrical vertical portion 61a as shown in FIG. 3 is contact with the portion 60 having a larger diameter, and the projections 85 are equidistantly provided in the outer peripheral surface of the portion 61a, as shown in FIG. 17. Between these projections 85, 85, there are provided many reverse "L"-like grooves 86 which comprise longitudinal grooves 86a which the projections 62 of the portion 60 having a larger diameter pass through and transverse grooves 86b which communicate with the grooves 86a and the projections 62 engage with. At the same time, the internal peripheral surface 87 is formed in a taper shape expanding downwardly and a longitudinal raised portion 88 contacting with an outer periphery of the upper end of the spiral body 30A is formed, so that the juice flowing gap 89 is formed between the spiral body 30A and the lid. In FIG. 16, there is formed in a horizontal portion 61b of the lid 61 an opening 93 having a downwardly raised portion 92 in a peripheral edge and having a diameter smaller than the internal diameter of the spiral body 30A. The horizontal portion 61b serves to press down the upper end surface of the filter 30 by the lower surface thereof and to prevent the residue from flying out in the peripheral edge portion of the opening 93.

Again referring to FIG. 2, a material throwing-in cylinder 44 is internally and vertically provided in a vessel lid 21b so as to be opposing to a portion offset from the center of the cutter 38 and a restricting plate 41 is internally provided in a horizontal direction in the periphery of the cylinder 44 so as to cover substantially the whole surface of the cutter 38. An outer edge of the restricting plate 41 is disposed on the outer side of the re-cutting blades 40 which is curved downwardly, so that the outer edge forms a depending portion 41a opposing to the extensions 42. The depending portion 41a is formed with a single or a plurality of slits for making materials fly out collectly, and is integrally formed with a cut material pressing projection 94 in the outer peripheral surface thereof. A push rod 95 pushes into the cylinder 44 the material thrown in and the raised portion 96 is obliquely formed in such a direction that, when the residue is excessively stored, the excessive residue goes away from the separator cylinder.

In addition, the vessel lid 21b is, as shown in FIG. 1, fixed to the casing 2 by a clamping device 97 attached to the casing, with the lid 21a being closed.

Now, referring to FIG. 1, the juice receiving and discharging portion C will be described in the following. A cup 98 receiving juice from a juice discharging outlet 25 has a triangular shape in section and disposed on the lower stepped portion 9 formed in a triangular shape in plane in a front side portion of the casing 2. In addition, the cap 98 is provided with a handle 99 in a corner thereof, so that taking out the cap from the front surface of the casing 2 can be facilitated.

Now, an operation of the above described embodiment will be described. Prior to production of juice, the projecting pieces 72, 72 of the beginning end of the filter expanded shown in FIG. 9 are engaged with the grooves 73, 73 and then, the filter 30 is mounted in the cylindrical portion 29b. Thereafter, the lid 61 is fitted into the portion 60 of the cylindrical portion 29b while compressing the filter 30, and, the projections 62 are inserted into the lateral groove 86b from the longitudinal groove 86a, so that the lid 61 is rotated in a clockwise direction as seen from the top until the projections 62 are positioned in the innermost recess of the lateral groove 86b. As a result, coupling of the lid 61 with the cylindrical portion 29b is completed. In such condition, the filter 30 is sufficiently compressed, as shown in FIG. 3, and hence is completely prevented from flying out. Then, the gap 79 is formed between an internal surface of the lid 61 and an upper end surface 70 of the filter 30 by the projections 82 of the upper end, and the gap 69 is formed by the projections 81 and the gap 80 is formed by the projections 82 of the lower end, respectively, with a predetermined spacing. At the same time, the lower end portion of the filter 30 is engaged with the cylindrical portion 29b by engagement of the projections 59 and the grooves 83a in the lower end of the filter 30, and the upper end portion of the filter 30 is engaged with the lid 61 by engagement of the projections 84 and the grooves 83a of the upper end, whereby the rotation of the filter 30 can be prevented in its upper and lower portions.

Figure 19:
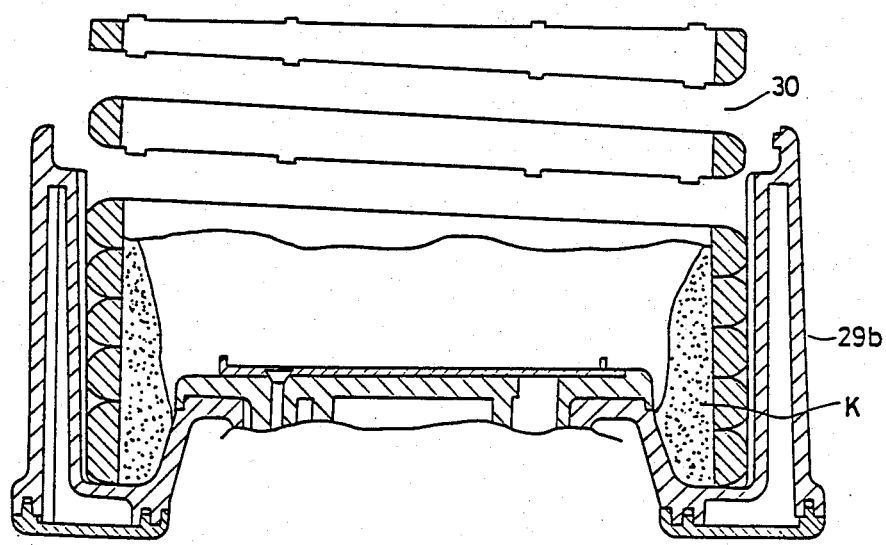
FIGS. 19 and 20 are sectional views in operation of the filter which is an embodiment of the present invention.

Now, the container 21a is covered with the lid 21b which, in turn, engages with the container 21a by rotating the clamp apparatus 97, so that a preparation of producing a juice is completed. Then, a motor is driven and materials such as fruit and vegetable are thrown into a throwing-in cylinder 44 and pushed thereinto by a push rod 95. Then, the materials are abraded or disintegrated by the grating edges 39 and a large piece of material such as peel which cannot be cut is re-cut into smaller pieces by the re-cutting blades 40 so that such peels fly in pieces to the gap between the restricting plate 41 and the base portion 29a or to a horizontal exterior from the notch of the depending portion 41a and stick to the internal periphery of the filter 30. This sticked material falls down along the tapered surface 75a of the filter 30 and is separated into the residue and juice, the juice reaching the internal periphery of the cylindrical portion 29b through the gaps 80 and 69 and moving upwardly through the gap 58 formed by the raised portions 57. Thereafter, the juice flows out from the separator cylinder 29 through the flowing gaps 90, 91 between the lid 61 and the cylindrical portion 29b. The juice flows down from the discharging outlet 25 and is received by the cup 98. On the other hand, the residue is gradually stored from the internal lower end portion H of the filter 30 while being pressed by the pressing projections 41a, and then the stored state is obtained as shown in FIG. 19. If materials are further cut, cut materials are stored in the internal upper portion of the filter 30 and the juice separated from the cut materials in the lower portion of the horizontal portion 61b of the lid 61 flows out from the centrifugal separator cylinder 29 through the gaps 79 - 89 - 90 -91 and 69 - 90 - 91. If and when further materials are cut and cut materials are stored in the inside of the diameter of the opening 93 of the lid 61, the residue goes out from the separator cylinder 29 by the raised portion 96.

Figure 20:
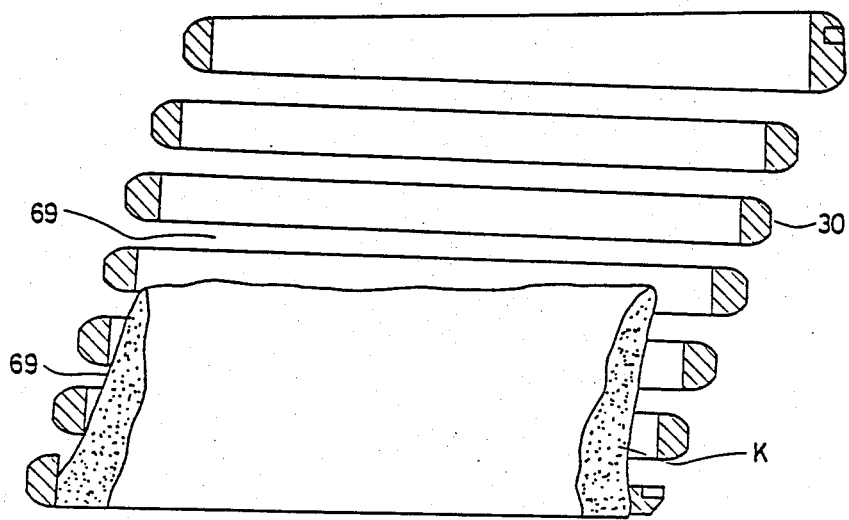

After producing juice, in order to remove the residue, the motor is first stopped, the clamping apparatus 97 is disengaged and the lid 21b is removed. Then, the lid 61 is disengaged with the cylindrical portion 29b by rotation of the lid 61 and, consequently, the filter 30 expands by its own elasticity, as shown in FIG. 19 and the upper end thereof projects upwardly beyond the upper end of the cylindrical portion 29b. By grasping the projected portion to pull up upwardly, the filter 30 can be easily taken out from the separator cylinder 29. Since the residue K sticks to the internal peripheral lower portion of the filter 30, the filter 30 is expanded or compressed by holding both ends of the filter 30 by hand and also shifted in a traverse direction as shown in FIG. 20 so that a lump of the residue K can be easily taken off from the internal peripheral surface of the filter. In addition, since the spacing of the gap 69 is expanded by its own elasticity, the cellulose and the like sticking to the gap 69 can be easily washed out by water washing, with the filter being expanded.

In order to clean the internal portion of the centrifugal separator cylinder 29, the base portion 29a is disengaged with the connector 11 and then the separator cylinder 29 is removed therefrom and washed by water. However, such washing can be further facilitated by removing the ring body 29c from the base portion 29a and separating the base portion 29a from the cylindrical portion 29b.

In order to achieve a grating function, such as a grated radish and ice cutting, the cylindrical portion 29b is separated from the base portion 29a and only the base portion 29a is coupled to the low-speed driving connector 11 and the valve 25 is closed and then the motor is driven. Thereafter, just as the same in producing juice, material is thrown into the cylinder 44 and the material is grated by the grating edges 39 and grated materials are collected in the container 21a.

Figure 21:
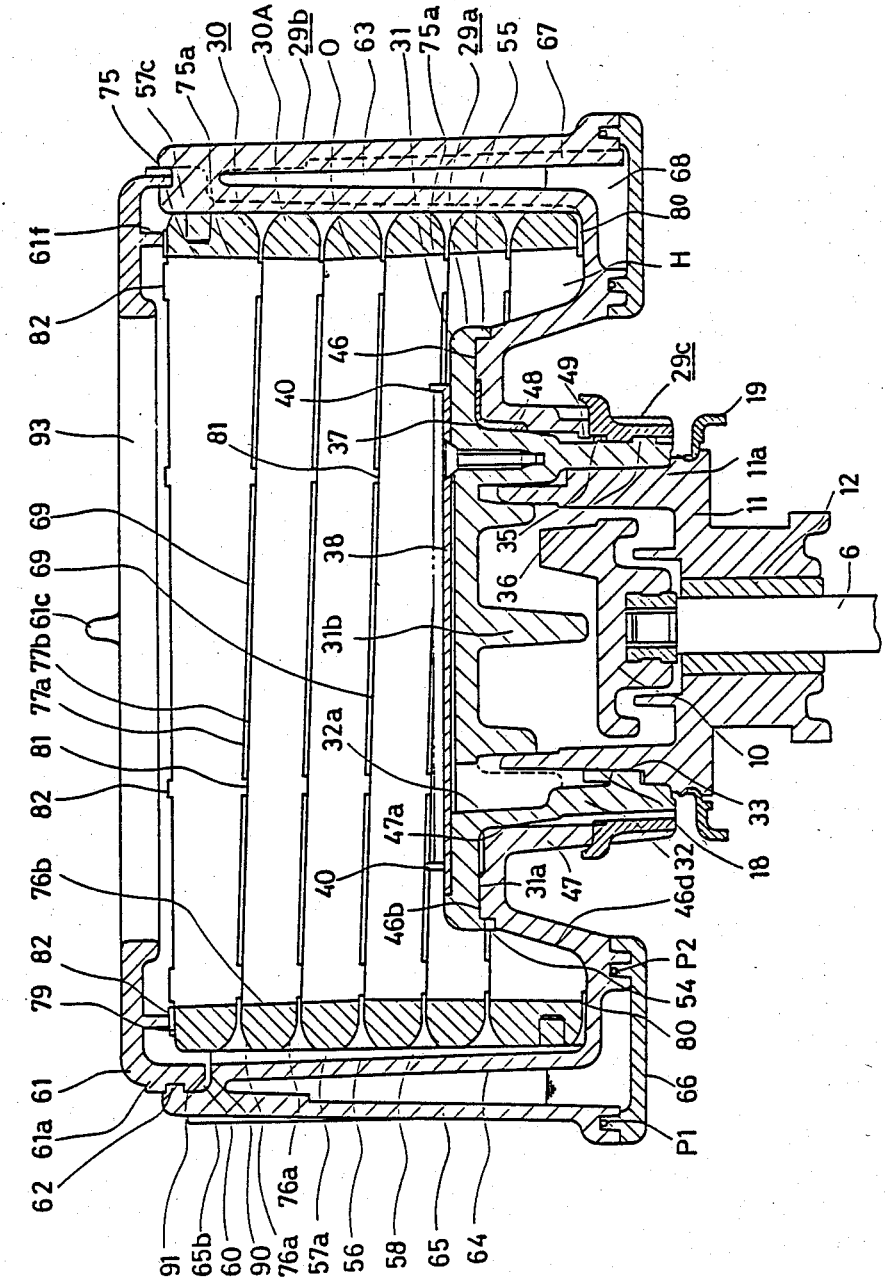
FIG. 21 is a cross sectional view showing another embodiment of the centrifugal cylinder and the cylindrical filter.

FIG. 21 shows another embodiment of the centrifugal separator cylinder 29 having a connector floating preventing projection 31b disposed in a central lower surface of the horizontal portion 31. An annular raised portion 61f provided in a lower surface of the lid 61 serves to press an upper end surface of the filter 30 so that the residue can be prevented from flying out in the peripheral edge portion of the opening 93.

Figure 22:
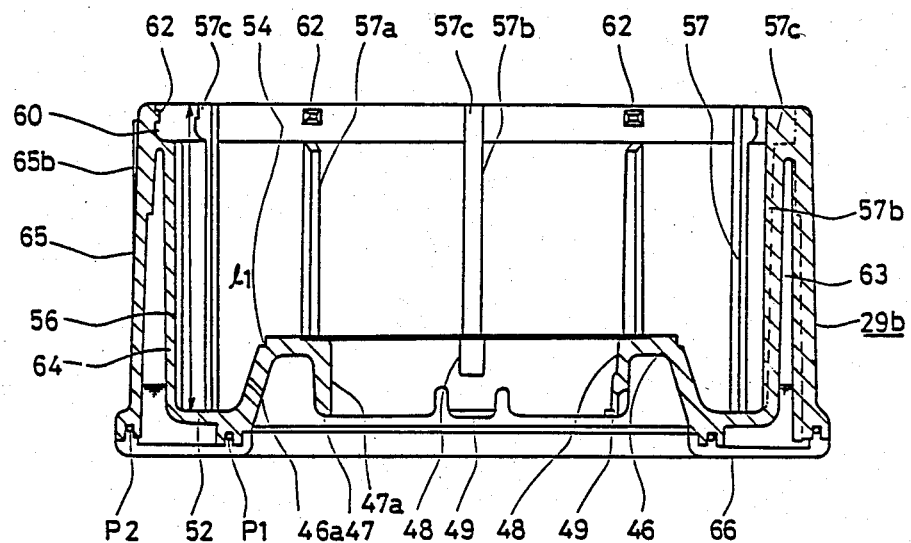
FIG. 22 is a cross sectional view of another embodiment of the centrifugal separator cylinder.
Figure 23:
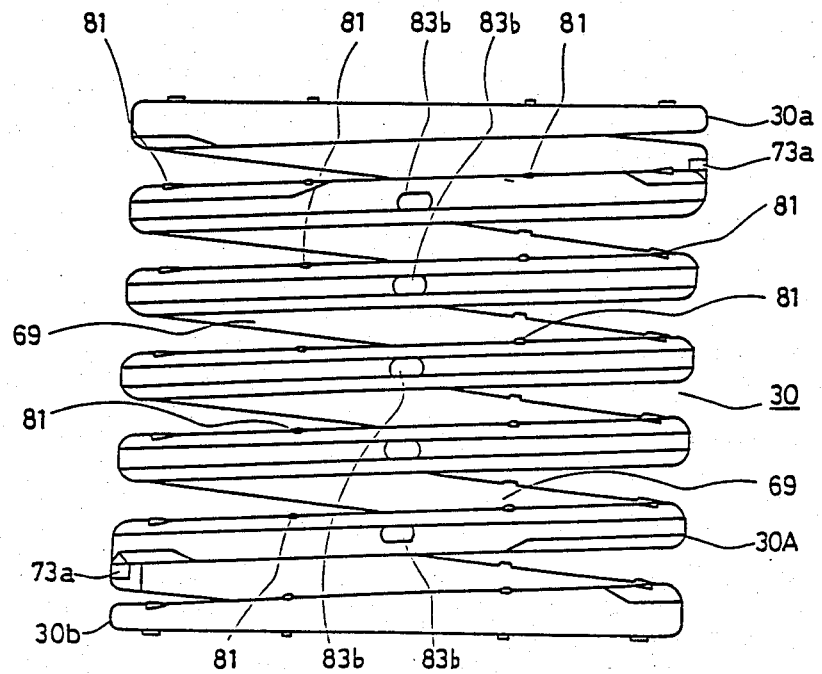
FIGS. 23 and 24 are side views of another embodiment of the cylindrical filter.

FIG. 22 is a cross sectional view showing the FIG. 21 embodiment of a centrifugal separator cylinder 29 and, FIG. 23 is a side view showing the filter 30 mounted in the centrifugal separator cylinder 29 shown in FIG. 21.

In FIG. 22, a plurality of raised portions or ridges 57a, 57b extending in a longitudinal direction with a suitable spacing are formed in the internal peripheral surface 56 of the cylinder portion 29b in which the filter 30 is mounted, so that juice flowing gap 58 is formed between the outer peripheral surface of the filter 30 and the internal peripheral surface 56 of the cylinder portion 29b. The raised portions 57a, 57b engage with the projections 83b provided in the outer peripheral surface of the filter 30 shown in FIG. 23, with an angle of approximately 180° with respect to each other in a rotational direction, so that the relative rotation of the filter 30 can be prevented. In addition, the raised portion 57b is wider than the raised portion 57a in lateral width, and extends to the portion 60 having a larger diameter formed an internal upper end portion of the cylinder portion 29b, so that a supporting projection 57c contacting the outer peripheral surface of the upper end of the filter 30 can be connected to the upper end of the raised portion 57b.

Figure 24:
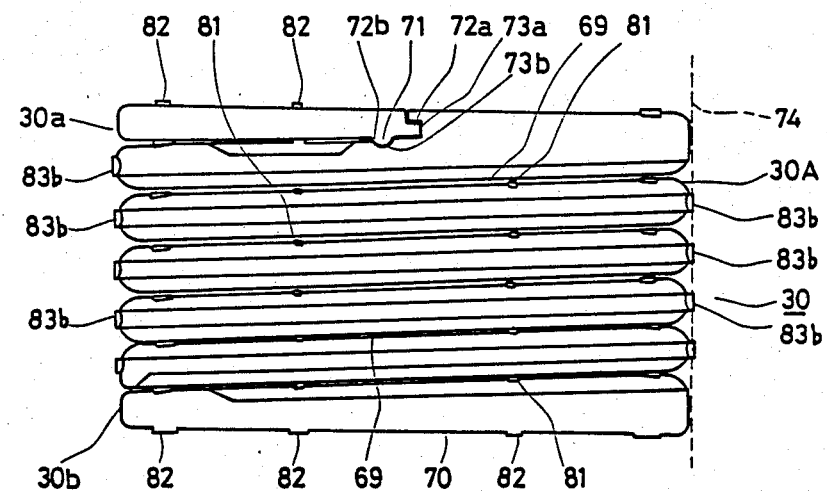

As shown in FIG. 24, there are provided a projection 72a and a projection 72b in the end portions 71, 71 of the filter 30 shown in FIG. 21 and there are formed in butt surface corresponding to the end portions 71, 71, grooves 73a, 73b fitting into and engaging with the projections 72a, 72b, respectively, so that the filter 30 cannot be disassembled in axial direction and rotational direction. Through such an engagement of the projection 72a and groove 73a, the filter 30 extends only slightly because of the force exerted on the end portions 30a, 30a when the filter 30 having a sticking residue is pulled up, and, through a second engagement of the other projection 72b and groove 73b, increase of the diameter of the filter 30 is prevented at the rotation thereof so that the projection 72a is not disengaged with the groove 73a.

Figure 25:
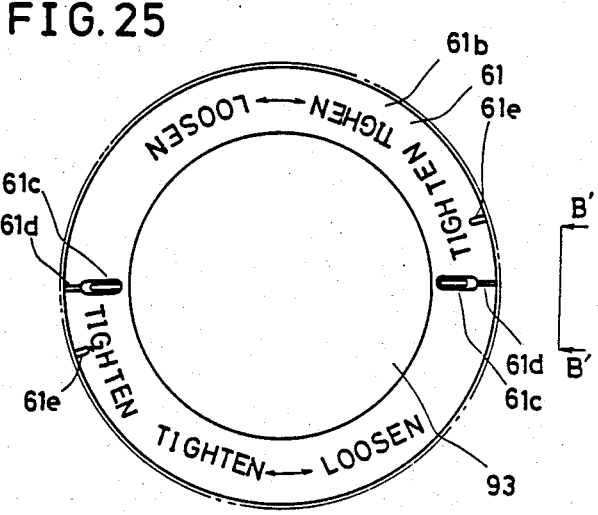
FIG. 25 is a plan view of another embodiment of a lid for pressing the cylindrical filter.
Figure 26:
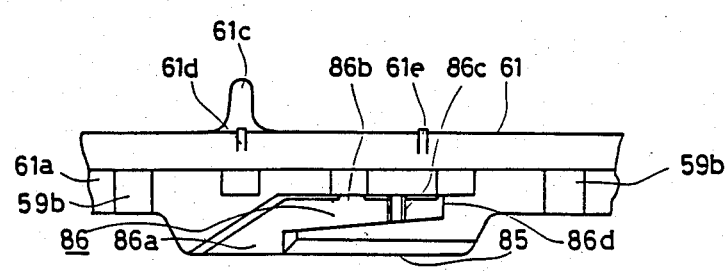
FIG. 26 is an enlarged view of an essential part as viewed from an arrow B' of the lid shown in FIG. 25.

FIG. 25 is a plan view of another embodiment of a lid for pressing the cylindrical filter and FIG. 26 is an enlarged view of an essential part as viewed from an arrow B' of the lid shown in FIG. 25. As shown in FIG. 26, a cylindrical vertical portion 61a has six portions 85 partly projecting downwardly. In the outer periphery of these portions, reverse "L"-like grooves 86 are formed which comprises a longitudinal groove 86a through which the projection 62 of the larger-diameter-portion 60 passes, and a lateral groove 86b communicating with the groove 86a and engaging with the projection 62. Many grooves 59b are also formed for juice flowing. The raised portion 86c is provided in the traverse groove 86b and juice flowing gaps 90, 91 are formed between the vertical portion 61a and the portion 60.

In addition, as shown in FIG. 26, handles 61c, 61c for rotation are integrally projected in the outer surface of the lid 61 and a first mark 61d is formed in a projected manner in a position corresponding to the handles. In addition, in a position corresponding to the innermost recess 86d in the groove 86b, a second mark 61e in a projected manner is formed and, as shown in FIG. 25, there are provided an indication "TIGHTEN" in the vicinity of the projection 61e and indications "TIGHTEN" and "LOOSEN" in a position far away from the projection 61e, which indicates a direction of rotation. In an outer periphery of the upper end of the cylindrical portion 29b, as shown in FIG. 22, a third mark 65b indicating a position of the projection 62 is formed in a projected manner, so that the lid 61 is fitted into the larger-diameter-portion 60 of the cylindrical portion 29b and is rotated in a direction of "TIGHTEN" by the handle 61c so that the first mark 61d and the third mark 65b are registered with each other. Then, the projection 62 moves along the lateral groove 86b and is forced to fit into the innermost recess 86d of the groove 86b beyond the projected portion 86c, so that the lid 61 can be securely prevented from being rotated. At that time, the user can confirm that the second mark 61e is registered with the third mark 65b and also can confirm, with ease, that the lid 61 has been completely closed, by the feeling or sound when the projection 62 moves beyond the projected portion 86c. Meanwhile, the first mark may be replaced by the handles 61c, 61c.

The present invention is not intended to limit the above described embodiments. For example, a member functioning as the lid 61 may be integrally formed on the upper end of the filter 30, and in addition, a handle capable of taking a standing or upright position and a laying position may be provided in the upper end of the filter 30. In the following, another embodiment of the present invention in which a filter and a lid are integrally formed and a handle is provided will be described.

Figure 27:
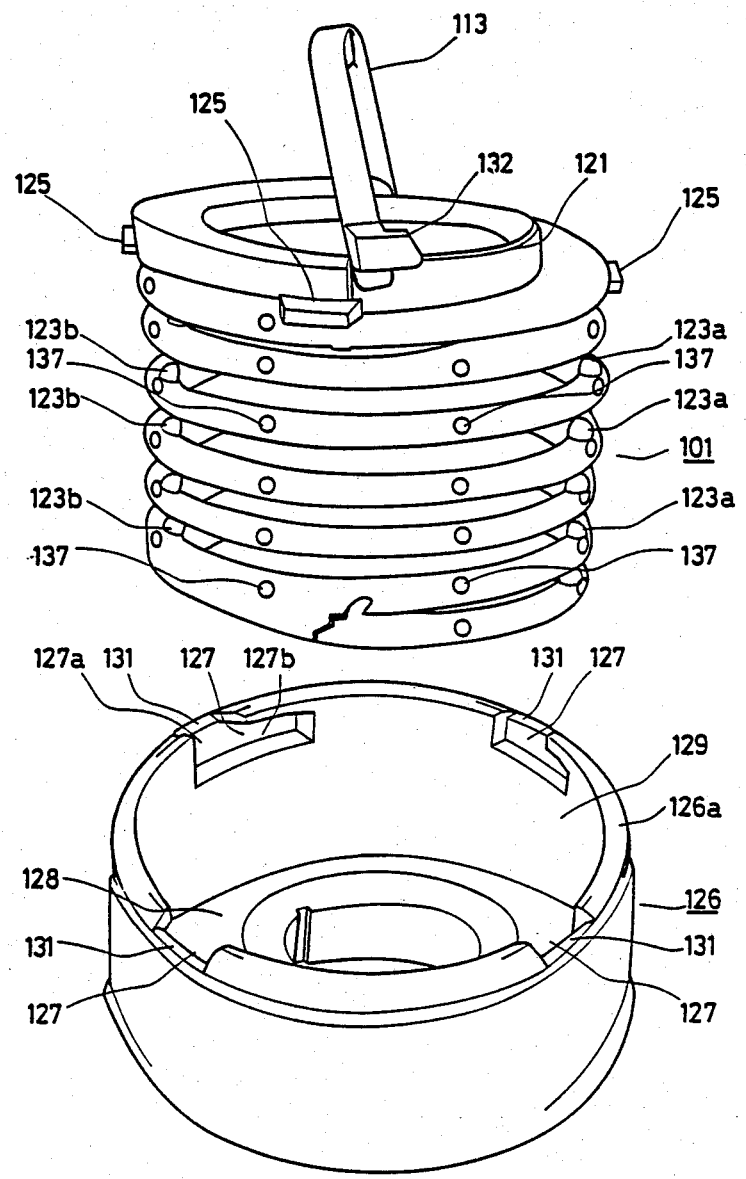
FIG. 27 is an assembly diagram of the centrifugal separator cylinder and cylindrical filter of other embodiment of the present invention.

FIG. 27 is a perspective view showing the whole of the filter 101 and the centrifugal separator cylinder 126, which is another embodiment of the present invention. As shown in FIG. 27, in the filter 101 of the present embodiment, unlike the above described embodiment, a portion corresponding to the lid 61 of the above described embodiment is integrally formed in the uppermost element of the filter 101 and a handle 113 which can take a standing position and a laying position is provided.

Figure 28:
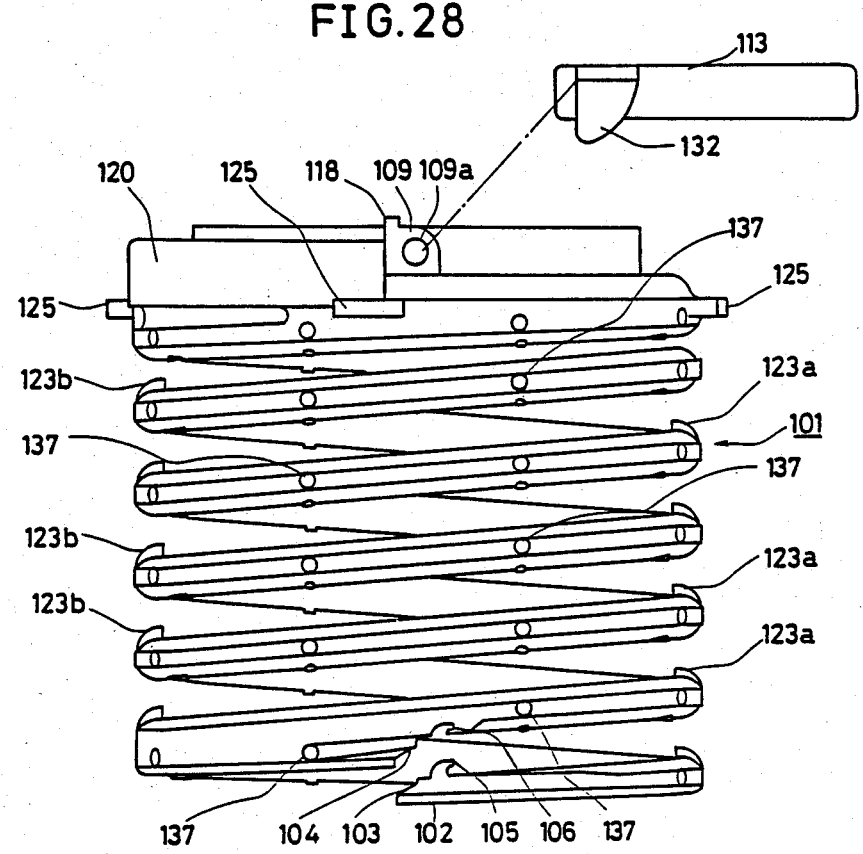
FIG. 28 is a side view of the cylindrical filter which is other embodiment of the present invention in which a handle is exploded from the filter.

FIG. 28 is a side view of a filter 101 in expanded state. As shown in FIG. 28, in the lowest end of the filter 101, the butt surfaces 103, 104 of the terminal end 102 are obliquely formed and there are formed a hook-like convex portion 105 and a concave portion 106 engaging with the convex portion 105 in a vertical direction. Through engagement of the these concave and convex portions, the terminal end 102 can be detachable, but engagement of the terminal end 102 do not disengage in the vertical direction.

Figure 29:
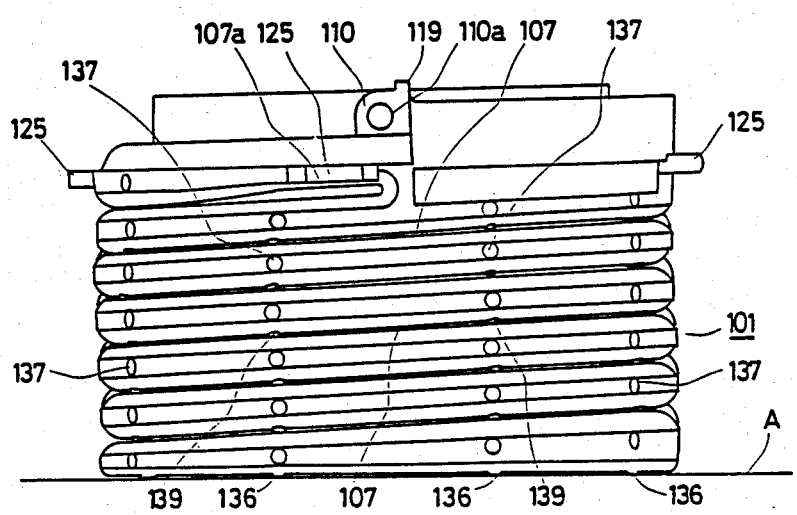
FIG. 29 is a side view of the cylindrical filter which is another embodiment of the present invention.

Further, as shown in FIG. 28, in the uppermost element of the filter 101, the terminal end thereof is not detachable, but is integrally formed. As a result, as shown in FIG. 29, the spacing in the upper terminal end 107a can be made wider than the remaining gaps, so that washing these portions can be facilitated.

Figure 38:
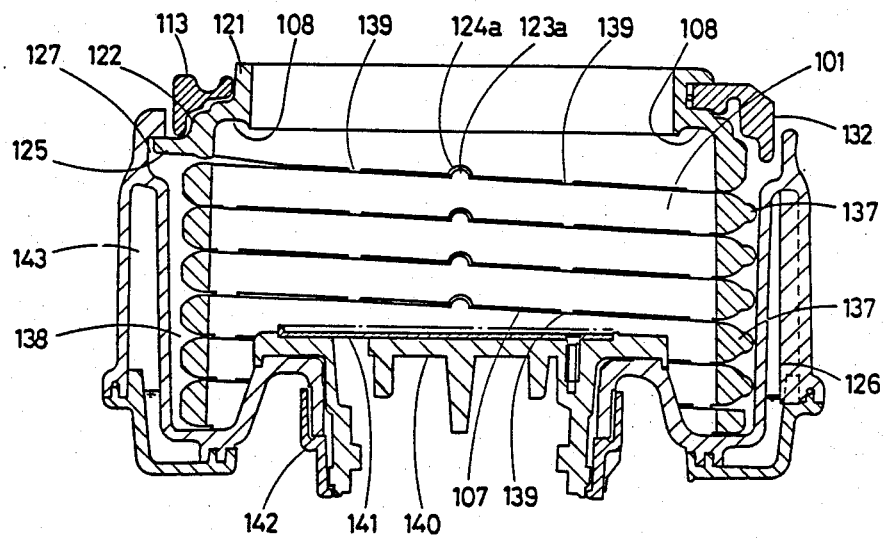
FIG. 38 is a cross sectional view, taken along the line A—A in FIG. 31, showing the state where the cylindrical filter is mounted in the centrifugal separator cylinder.

As shown in FIG. 38, in the internal periphery of the uppermost element of the filter 101, an annular flange 108 for stopping residue is formed in an integral manner. The considerable strength is required in the uppermost element of the filter 101 because the weight of the filter 101 itself and the residue is exerted on the filter 101 when the filter 101 is taken out. However, the provision of the annular flange 8 can increase such strength. As a result, it is not necessary to increase the height in section of the uppermost portion of the filter 101 for reinforcement nor to have an individual residue pressing member. The internal peripheral surface of the filter 101 is tapered such that the diameter gradually becomes larger downwardly.

Figure 30A:
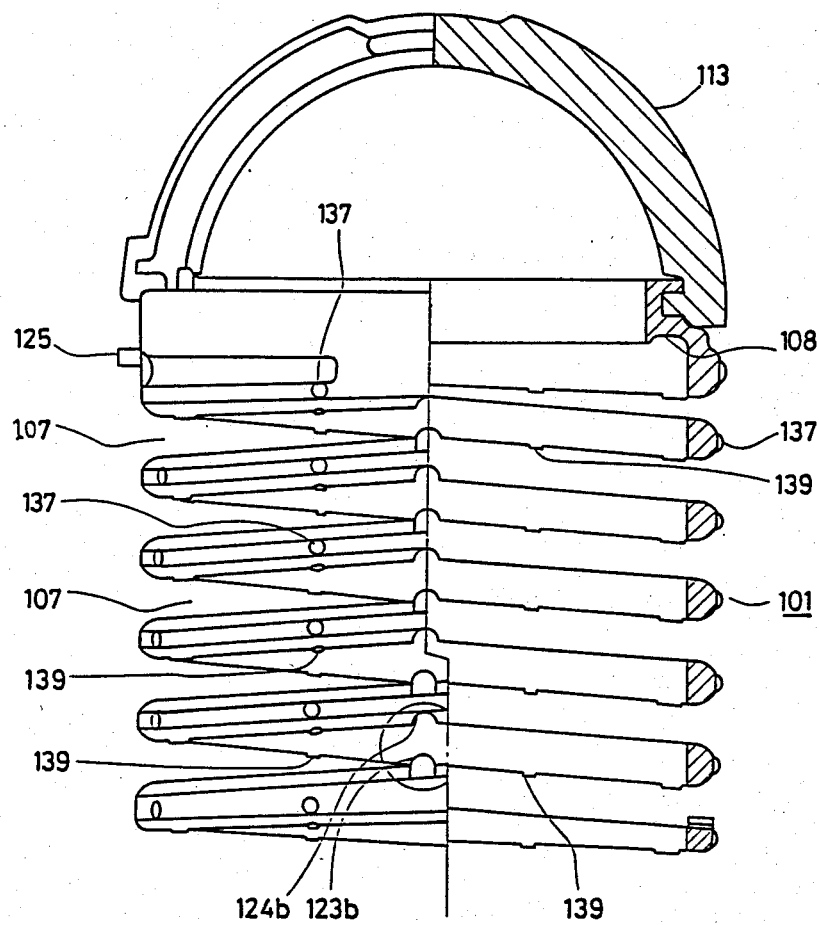
FIG. 30A is a cross sectional view of an essential part of the cylindrical filter of another embodiment of the present invention and FIG. 30B is an enlarged view of the essential part thereof.
Figure 30B:
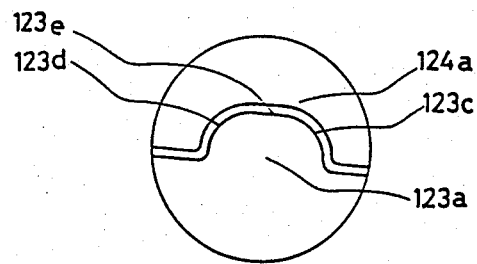

FIG. 30A is a cross sectional view of the essential part of the filter 101 and FIG. 30B is a partial enlarged view thereof. As shown in FIGS. 30A and 30B, between adjacent portions of the filter 101, projections 123a are formed on an upper surface of the lower portion and concave grooves 124a fitting into the projections 123a are formed on a lower surface of an upper portion, so that the projections 123a and grooves 124a are arrayed in a linear manner in a vertical direction. In addition, a group of projections 123b and concave grooves 124b having the same shapes as those in the group of projections 123a and concave grooves 124a are formed, with an interval of about 180°, in a position of point symmetry with respect to the groups of the projections 123a and the concave grooves 124a. Each of these projections 123a, 123b and concave grooves 124a, 124b constitutes preventing means for preventing a slide in a rotational direction of each element of the filter 101. A spiral filter 101 has a nature of twisting in a rotational direction even if the lower end and/or upper end of the filter 101 are fixed. Particularly, the filter 101 is twisted when the filter 101 is rotated at the time of rotation of a centrifugal separator cylinder and when the filter 101 is taken out. In the former case, attachment of the filter 101 is not secure and in the latter case, the diameter of the filter 101 changes and hence it is difficult to take out the filter. However, according to the present embodiment, there is provided between portions of the filter 101, as described in the foregoing, twist preventing means comprising projections 123a, 123b and grooves 124a, 124b for preventing twist in a rotational direction and hence, the above described defect can be eliminated. Since the group of the projections 123a and grooves 124a and the group of other projections 123b and grooves 124b are provided opposed to each other, with an angle of 180°, the filter 101 cannot be twisted in a rotational direction, but can be shifted along a line connecting each of groups opposing to each other and hence removal of residue can be easily made.

The grooves 124a, 124b are formed in a notched manner and pass through in a radial direction of the filter 101 and the projections 123a, 123b are detachable in a radial direction thereof. In addition, as shown in FIG. 30B, rounded portions 123c, 123d are formed in the right and left corner portions of the projections 123a, 123b, and small flat portion 123e is formed in the top portion thereof and as a result, the projections 123a, 123b have generally half-circular shape, as a whole. However, the flat portion 123e is not necessarily needed. The grooves 124a, 124b are formed in generally half-circular form so as to correspond to the shapes of the projections 123a, 123b. Therefore, even if the filter 101 is slightly twisted in a rotational direction, the projections 123a, 123b are guided into a corner portion and automatically enter into the grooves 124a, 124b by the weight of the filter 101 itself or the pressing force, so that the twist of the filter 101 can be automatically eliminated and the original cylindrical shape can be easily maintained.

Figure 31:
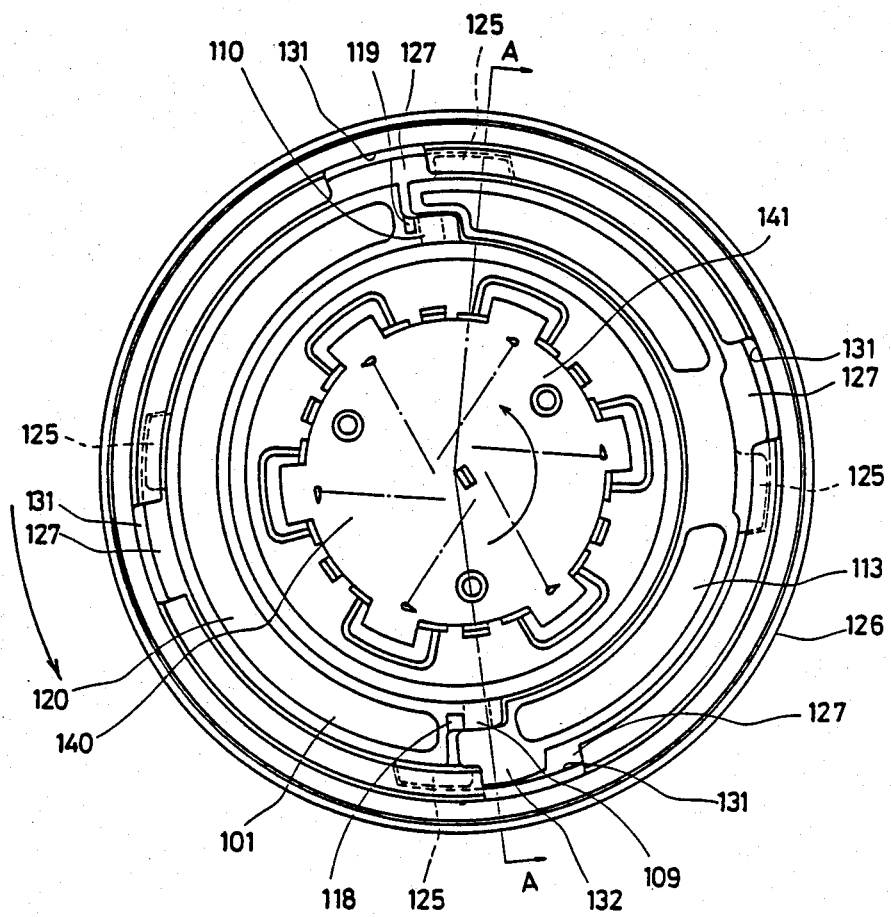
FIG. 31 is a plan view of the centrifugal separator cylinder and the cylindrical filter of another embodiment of the present invention.

FIG. 31 is a plan view of the embodiment. As shown in FIG. 31, in the uppermost outer periphery of the filter 101, engaging projections 125 are projected horizontally and outwardly with an interval of 90° with respect to each other. As described subsequently, these projections 125 constitute filter pressing means for cooperating with engaging grooves 127 formed in an internal periphery of an upper end of the separator cylinder 126 for pressing the filter 101 into the internal bottom surface of the separator cylinder 126 from the upper portion so as to prevent expansion of spacing between portions of the filter 101, and rotation preventing means for preventing rotation of the filter 101 in a counter separator-rotating direction. In the above described embodiment in which the lid 61 is separated from the filter, the user happens to forget to mount a lid 61. However, according to the present embodiment, a filter pressing lid for pressing a filter is not needed by pressing a spiral filter 101 due to engagement of the projections 125 of the filter itself and the grooves 127 of the separator cylinder 126, and hence, there is no fear that a user forgets to mount a lid. In the above described embodiment, if a user happens to forget to mount the lid 61, residue is forced to enter into juice flowing gaps of the filter during driving of the juicer and a force is exerted on the filter in such a direction that the filter is expanded and the filter is flown out from the separator cylinder which causes a problem that the flown filter bumps into the lid of a container and is damaged. However, according to the present embodiment, such problem can be eliminated.

Figure 32:
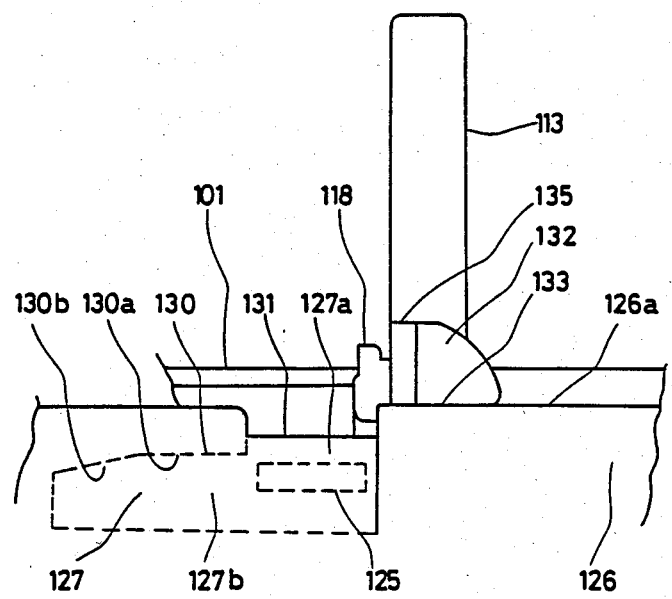
FIG. 32 is an enlarged side view of the centrifugal separator and cylindrical filter of the other embodiment of the present invention.

As shown in FIG. 27, a bottom surface 28 and an internal peripheral surface 129 of the separator cylinder 126 both are flattened and no rib-like projections are formed, and the above described engaging grooves 127 are formed corresponding to the engaging projections 125, in the upper end of the internal peripheral surface 129. Each of the engaging grooves 127 comprises a vertical portion 127a having an opening to an exterior in the upper end thereof and receiving an engaging projection 125 in a vertical direction, and a horizontal portion 127b extending, in the lower portion of the vertical portion 127a, in a counter rotational direction of the separator and receiving the engaging projection 125 in a horizontal direction. Furthermore, FIG. 32 is an enlarged drawing of an essential part of the engaging groove 127, in which an upper wall 130 of the horizontal portion 127b comprises a horizontal surface 130a which is made horizontal on the vertical portion side, and a oblique surface 130b which is oblique downwardly on the vertical portion side. The engaging projection 125 is adapted such that, with the filter 101 being compressed as shown in FIG. 29, the level of the upper surface is lower than the level of the horizontal surface 130a and is higher than a portion of the oblique surface 130b, so that the projection 125 comes to engage with the oblique surface 130b by rotation of the projection 125 after the engaging projection 125 is inserted into the vertical portion 127a of the groove 127. Such oblique engagement constitutes filter pressing means for pressing the filter 101 from the top so as to prevent expansion of spacing between elements of the filter 101 and also constitutes rotation preventing means for preventing filter 101 from rotating through a predetermined angle in a counter separator-rotating direction by inertia when the separator cylinder 126 is driven. In addition, in the upper end of the vertical portion 127a of the engaging groove 127, a notch 131 is formed, so that a handle 113 as described subsequently is exposed widely in a vertical direction whereby a finger of a user can be easily latched when the handle 113 is moved to a rising or standing position.

Figure 33:
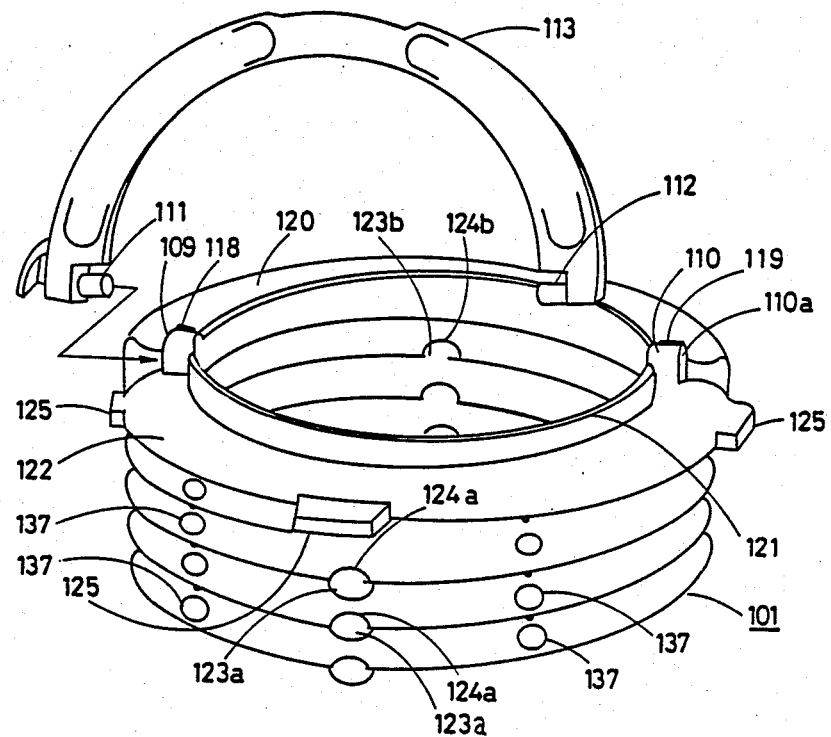
FIG. 33 is an assembly diagram of the cylindrical filter and handle of another embodiment of the present invention.

As shown in FIG. 33, in an upper surface of the uppermost element of the filter 101, a pair of bearing portions 109, 110 are formed and shafts 111, 112 projected inwardly in both ends of the handle 113 having generally half-circular shape are inserted into shaft holes 109a, 110a, respectively, of the bearing portions 109, 110, so that the handle 113 is rotatably supported. These shafts 111 and 112 are adapted such that their diameters are different from each other and hence holes 109a and 110a are also different from each other in their diameter. Accordingly, attachment in an erroneous direction is impossible. Furthermore, by forming the tip of one shaft 112 in a oblique manner, an operation for inserting the shaft 112 into the shaft hole 110a by elastic deformation of handle, after insertion of the shaft 111 into the shaft hole 109a, can be made easier.

Figure 34:
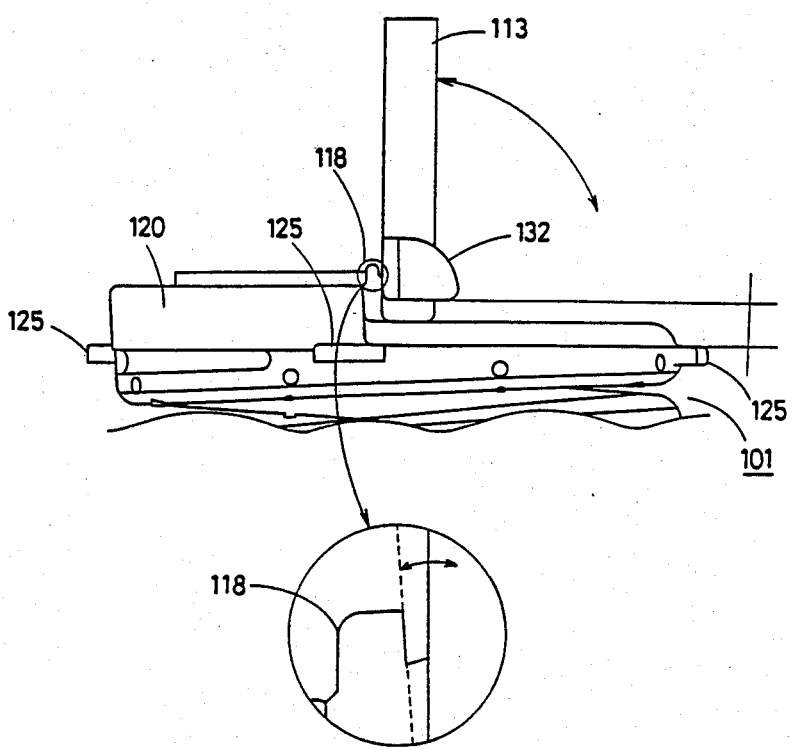
FIG. 34 is a side view showing a handle in an upright position.

As shown in FIG. 33, in a substantially center position of an upper surface of the bearing portions 109, 110, ribs 118, 119 for restricting rotation of the handle 113 in one way are formed. Configuration of these ribs 118, 119 are shown in detail in FIG. 34. In order to balance the filter 101 in weight with respect to a horizontal direction when the handle 113 is in a laying position, a counter balance portion 120 having substantially the same configuration as the handle 113 is integrally formed on the side opposite to the position where the handle lays in the uppermost portion of the filter 101. FIG. 38 is a cross sectional view of an essential part of the present embodiment, in which a projected wall 121 is provided in the internal peripheral surface at the laying position of the handle, so that residue never enters into spacings between an end surface 122 on the handle side in the uppermost portion of the filter 101 and the laying handle 113.

Figure 35:
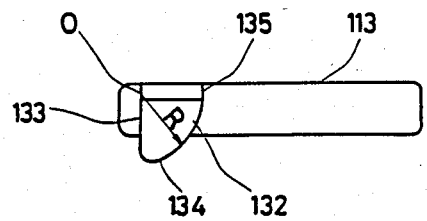
FIG. 35 is a side view showing a handle and a restricting piece.

Now, referring to FIG. 35 showing the state where the handle 113 is rotated to a laying position, a sectorial restricting piece 132 integrally formed on one end of the handle 113 has a first vertical surface 133, an arcuate surface 134 which is formed by drawing an arc upwardly from the lower end of the first vertical surface 133, with a radius R, with respect to a rotational center O of the handle, and a smaller second vertical surface 135 formed on an upper end of the arcuate surface 134. As shown in FIG. 32, the first vertical surface 133 serves as a supporting surface for contacting with the upper end surface 126a of the separator cylinder 126 and supporting the handle 113 in an upright or standing position, with the restricting piece 132 not being inserted into the groove 127. In addition, as shown in FIG. 36, the second vertical surface 135 serves as a rotation preventing surface for preventing rotation of projection 125 in a separator cylinder rotating direction, that is, in a direction in which the projections 125 is disengaged with the vertical portion 127b, with the restricting piece 132 being inserted into the engaging groove 127 at the laying position of the handle 113. Thus, the groove for engagement of the projection 125 is common to the groove for engagement of the restricting piece 132, the number of grooves can be made smaller and the strength of the separator cylinder 126 can be enhanced and, furthermore, washing of the separator cylinder 126 becomes easier. In addition, by forming an arcuate surface 134, the handle 113 can be raised in an upright position, without rotating the filter in a counter rotating direction of the separator cylinder when the handle 113 is raised from the position shown in FIG. 36. As shown in FIG. 36, in order to use the vertical portion 127a of the groove 127 for engaging with the engaging projection 125, as a groove for engaging with the restricting piece 132, the position for attachment of the handle 113, that is, the bearing portion 109 just be in vicinity of the projection 125. The width $l_1$ of the opening of the vertical portion 127a is made smaller than the distance $l_2$ between one end 125a of the projection 125 as shown in FIG. 36 and the second vertical surface 135, so that the projection 125 engages with a horizontal surface 130a of the groove 127 so as to prevent an upward disengagement even if an upward force is applied to the filter 101 with a normal mounting of the filter 101. In addition, the above described width $l_1$ is made smaller than the distance $l_3$ between the above described one end 125a and the first vertical surface 133, so that the projection 125 and the restricting piece 132 do not enter into the groove 127 when the filter 101 is mounted with the handle 113 being in its laying positions.

Figure 37:
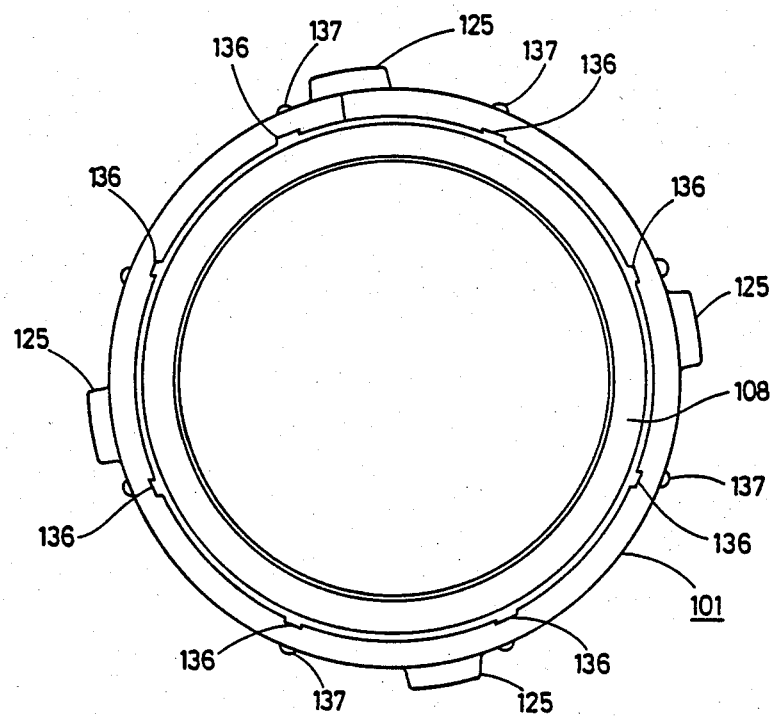
FIG. 37 is a plan view of the cylindrical filter of other embodiment of the present invention.

The projection 136 as shown in FIGS. 29 and 37 corresponds to a juice flowing gap holding projection 82 in the above described embodiment and, preferably, the projection 136 is formed in a circumferentially elongating shape as shown in FIG. 37 so as to enable smooth rotation of the filter 101 when the separator cylinder 126 is started, or preferably the projection 136 is adapted such that the lower end thereof is formed in a ball-like shape so that a sliding resistance between the projection 136 and the internal bottom surface of the separator cylinder 126 may be made smaller. In addition, as shown in FIGS. 28 and 38, in the outer periphery of the filter 101, the projection 137 is provided, so that a juice flowing gap 138 is formed between the filter 101 and the internal peripheral surface 129 of the separator cylinder 126. Further, the projection 139 is also provided so as to keep constant the spiral juice flowing gap 107 of the filter 101.

Meanwhile, since the projections 123a, 123b and the grooves 124a, 124b are provided in surfaces constituting the juice flowing gap 107, the height of the filter 101 becomes higher if and when the filter 101 is shifted in a rotational direction, and hence, the projection 125 does not engage with the groove 127 and missetting of the filter 101 can be prevented.

In addition, although the filter 101 except for the handle 113 is integrally molded by resin by using a metal mold, the juice flowing gap 107 is molded so as to be relatively larger at the time of molding and after the molded filter 101 is taken out from the metal mold, the gap 107 is made narrower by a thermal correction. Then, as shown in FIG. 29, with the filter 101 being seated on the base A, the pitches of spiral filter 101 are in contact with each other by its weight, that is, the projections 139 contact with the opposing surface, and, with residue not sticking, as shown in FIG. 30A, filter 101 is pulled up by the handle 113 and as a result, the gap 107 expands by its weight, so that the projections 123a, 123b are disengaged with the grooves 124a, 124b.

FIG. 38 is a cross sectional view showing the state in which the filter 101 is mounted within the separator cylinder 126, in which a cutter base 140 having a cutter 141, a ring body 142 for coupling with the cutter base and a fluid balancer 143 correspond to a cylinder base 29a, a ring body 29c and a fluid balancer 63 in the above described embodiment, respectively.

As shown in FIG. 36, the filter 101 is adapted such that the filter 101 can be set in a container and a clamping apparatus (not shown) can be set, provided that (1) the engaging projection 125 engages with the engaging groove 127, (2) the handle 113 is laying and a restricting piece 132 engages with the engaging groove 127, (3) the projections 123a, 123b are in engagement with the grooves 124a, 124b, and (4) engagement of the terminal portion 102 of the filter 101 is completed.

Figure 39:
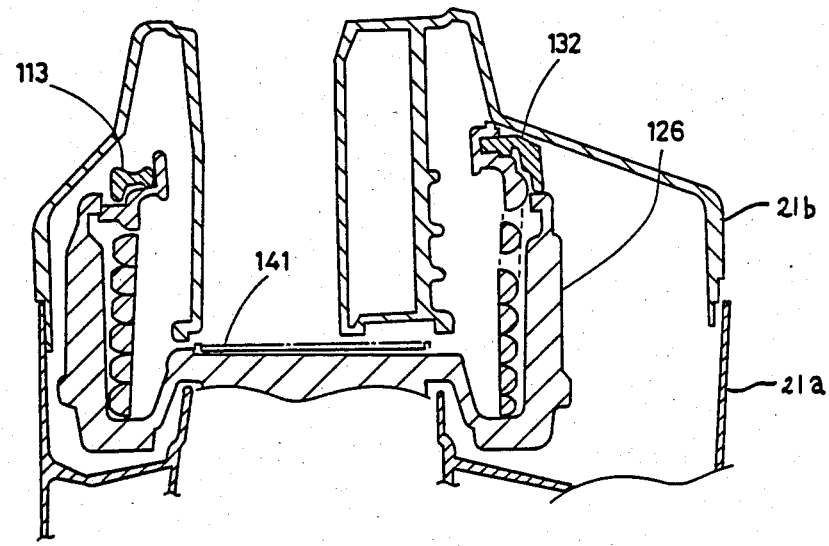
FIG. 39 is a cross sectional view of an essential part in operation of the juicer of another embodiment of the present invention.
Figure 42:
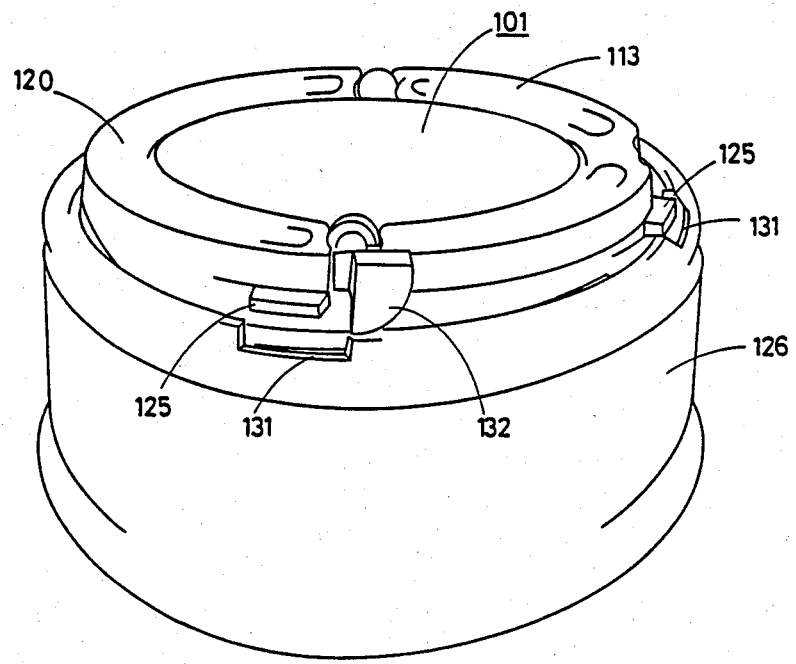
FIG. 42 is a perspective view of the centrifugal separator cylinder and the cylindrical filter in operation of another embodiment of the present invention.

More particularly, if and when the filter 101 is in an abnormal mounting state, in which at least one of the above described conditions (1) to (4) is not satisfied, the filter 101 projects upwardly from the separator cylinder 126, as compared with a normal state, for example, as shown in FIG. 42, and hence a container lid cannot be set, as shown in FIG. 39. The above described clamping apparatus 97 shown in FIG. 1 is provided with a safety device (not shown) for disabling a motor (not shown) unless the clamping apparatus 97 is set. More particularly, if the juicer is driven with the filter 101 being in an abnormal mounting state, that is, with the juice flowing gap 107 being expanded, residue flows out from the filter 101 through the gap 107 and is mixed with the juice. However, such situation can be avoided by adopting the above described structure.

Now, an operation of the present embodiment will be described.

First of all, for the purpose of normal mounting of the filter 101, the handle 113 of the filter 101 is held with hand, as shown in FIG. 27, the filter 101 is expanded by holding the handle 113 of the filter 101 by hand, and the filter 101 is inserted into the separator cylinder 126 from the lower end of the filter. After insertion, usually, the projections 125 are on the upper end 126a of the separator cylinder 126 and, with such state, the filter 101 is properly rotated and then, as shown in FIG. 32, the projection 125 are fitted into the vertical portions 127a so as to correspond to the vertical portion 127a of the groove 127. In such state, the handle 113 is held in an upright position by the first vertical surface 133 and of course, a container lid 21b cannot be set. In addition, in such a state, if and when the handle 113 is forced to be laid down, the filter 101, as shown in FIG. 42, floats upwardly by rotation of the restricting piece 132 and hence, as shown in FIG. 39, the container lid cannot be correctly set.

Figure 40:
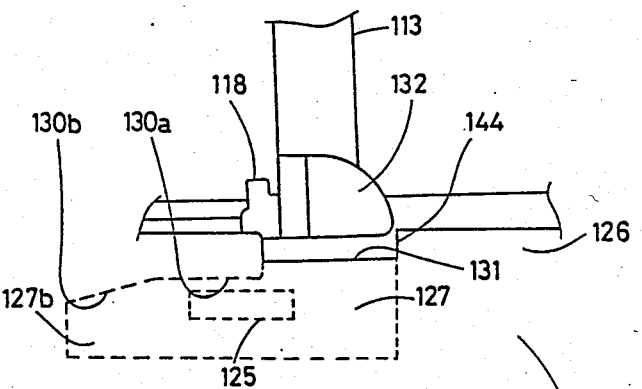
FIG. 40 is a side view of an essential part showing before and after the handle is fitted into engaging groove of the centrifugal separator cylinder.

If and when the filter 101 is further rotated a little bit from the position shown in FIG. 32, the restricting piece 132 enters into the groove 127 as shown in FIG. 40. In such a state, the engaging projection 125 has already been adapted such that the projection 125 is upwardly engaged with the horizontal portion 127b of the groove 127 and, a further laying down of the handle 113 achieves a normal mounting state as shown in FIG. 36. More particularly, the second vertical surface 135 of the restricting piece 132 is opposed to the wall 144 of the vertical portion 27a, so that rotation of the filter 101 in a separator rotating direction can be prevented through contact with the surface 135 and the wall 144.

Figure 41:
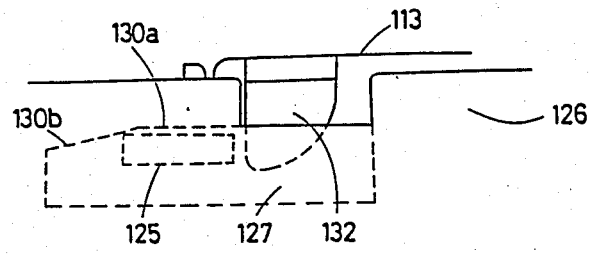
FIG. 41 is a side view of an essential part of the engaging groove at the time of start of the centrifugal separator cylinder.

In order to produce a juice, after appropriately attaching the filter 101 into the separator cylinder 126 as described in the foregoing, a container lid 21b is set and the clamping apparatus 97 is rotated to be set. Then, upon turning on a driving switch (not shown), the separator cylinder 126 is rotated, but the filter 101 makes a slide rotation in an opposite direction to the separator cylinder 126 by inertia. Through such rotation, the projection 125 engages with an oblique surface 130b of the groove 127, and, as shown in FIG. 41, the filter 101 is urged downwardly and maintains the spacings of the gap 107 against the force tending to expand upwardly the juice flowing gap 107 while rotating. In the above described embodiment, the filter pressing lid 61 is separately structured and hence, even if such lid is mounted, a user may sometimes happen to forget tighten it, in which case there is a fear that the filter flies out from the separator cylinder and the filter and the container lid can be subjected to damage. However, as described in the foregoing, such tendency to forget tightening the filter can be prevented since the projection 125 of the filter 101 per se is engaged with the groove 127 of the separator cylinder 126 by inertia of the filter 101 so that the filter 101 is pressed down. The weight of the filter 101 is heavy, and hence the inertia is relatively large and hence a large tightening force can be generated.

The function for producing juice is achieved in an identical manner to the above described embodiment.

After producing juice and upon turning off the switch, contrary to the start, the filter 101 makes a relative rotation in a separator cylinder rotating direction by inertia and hence, an automatic return to the position as shown in FIG. 36 is made. Subsequently, after taking off the container lid 21b, an exposed portion is latched from the notch 131 of the handle 113 and the handle 113 is raised in an upright position and then, after slightly pulling up the filter 101 as shown in FIG. 40, the projection 125 is disengaged with the horizontal portion 127b by rotating the filter 101 in a separator cylinder rotating direction as shown in FIG. 32. Then, in such a state, the handle 113 is pulled upwardly and the filter 101 can be taken out from the separator cylinder 126.

The state where the filter 101 is pulled out is similar to the state as shown in FIG. 27, but the spiral spacings of the filter 101 are sometimes held or maintained close or adjacent to each other, depending on adhesive force of residue sticking to the internal periphery of the filter 101. Therefore, by shifting the filter 101 in a horizontal direction or expanding upwardly, or shifting it in a rotational direction, the residue in a cylindrical shape can fall down from the filter 101.

In the embodiment as shown in FIGS. 27 to 42, the filter pressing means for pressing filter through engagement of the projection 125 of the filter 101 with the groove 127 of the separator cylinder 126 can be structured by providing the projection on the separator cylinder 126 side and providing the groove on the filter 101 side.

Figure 43:
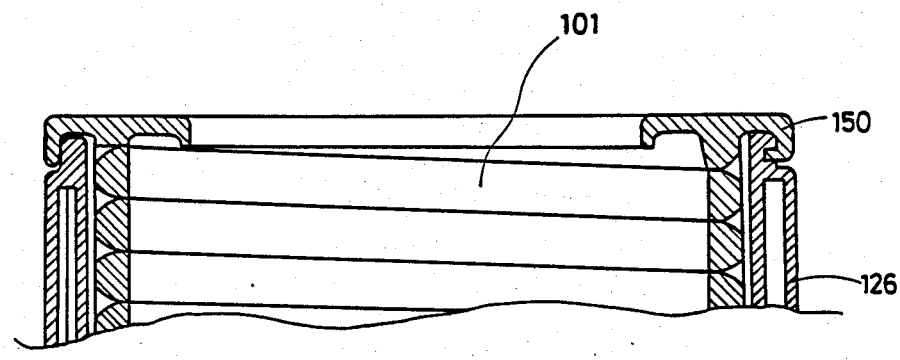
FIG. 43 is a cross sectional view of an essential part of the centrifugal separator cylinder and the cylindrical filter of another embodiment of the present invention.

In addition, as shown in FIG. 43, the filter pressing means may be formed between the outer periphery of the separator cylinder 126 and an annular engaging piece 150 formed in an upper end of the filter 101.

Figure 44:
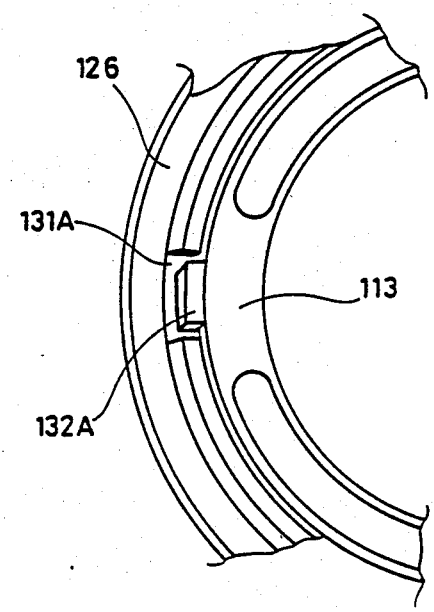
FIG. 44 is a plan view of an essential part of the centrifugal separator cylinder and the cylindrical filter of another embodiment of the present invention.

In addition, although, according to the present embodiment, the restricting piece 132 integrally provided in the base of the handle 113 is engaged with the groove 127 for engagement of the projection 125 so that rotation in a separator cylinder rotating direction can be prevented, as shown in FIG. 44, the restricting piece 132A serving also as a knob is provided in approximately center position of the handle 113 so that the piece 132A can be engaged with the notch 131 formed in an upper end of the separator cylinder 126 or a separate notch 131A.

Figure 45:
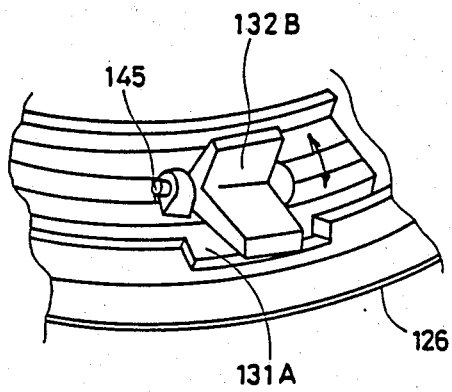
FIGS. 45 and 46 are perspective views of a restricting piece of another embodiment of the present invention.
Figure 46:
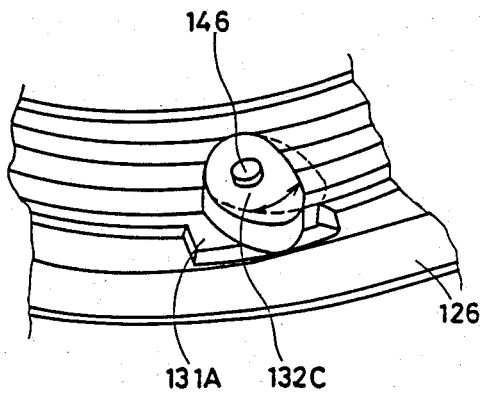

Further, as shown in FIG. 45, in an upper end of the filter 101, a restricting piece 132B in an "L" shape is provided which is rotatable with respect to the center of the shaft 145, so that piece 132B is laid down by the centrifuge by rotation of the separator cylinder 126 to be engaged with the notch 131A, and in addition, as shown in FIG. 46, a comb-like restricting plate 132C rotating with respect to the shaft 146 is provided to engage with the notch 131A.

Although in the present embodiment, the projections 123a, 123b are provided in the lower surface of the surfaces constituting the juice flowing gap 107 of the filter 101 and the grooves 124a, 124b are provided in the upper surface thereof, the projections may be provided on the upper surface and the grooves may be provided on the lower surface.

Figure 47:
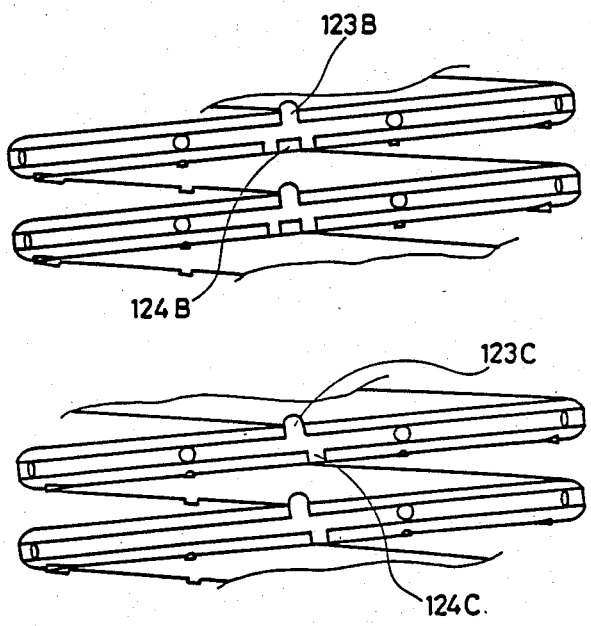

As shown in FIG. 47, the groove 124B and the projection 123B may be formed on the side of the outer periphery of the filter 101 and, in order to prevent twisting in a rotational direction at the time of start, as shown in FIG. 48, the rotation may be prevented by engagement between the projections 123C and the projection 124C.

Although the filter 101 is formed such that the portions of the filter are in contact with each other, with the filter 101 being disposed on the setting surface as shown in FIG. 29, the filter 101 may be formed such that spacing of the portion of the filter 101 is close with each other by applying force from the top.

In the embodiments described in the foregoing, a juice flows upwardly along the wall of the separator cylinder. However, the separator cylinder may be replaced by a separator cage having a multiplicity of fine holes on its peripheral surface, so that a juice can flow through such fine holes.

Although, in the above described embodiments, the filter and the separator cylinder were engaged by vertical and horizontal grooves and projections thereof, each vertical and horizontal portions may be made oblique with respect to vertical and horizontal lines.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A juice extractor comprising:
   a base having a motor;
   a vessel supported on said base;
   a centrifugal separator cylinder disposed in said vessel and rotatably driven by said motor, said centrifugal separator cylinder having an inner periphery, and in an inner bottom portion thereof, a cutter for cutting material;
   a cylindrical filter detachably mounted in said inner periphery of said centrifugal separator cylinder for separating juice and residue from the material cut by said cutter and for collecting said residue therein,
   said cylindrical filter comprising a spiral body having an expandable spiral juice flowing spacing formed between the adjacent spiral portions of the filter;
   filter pressing means for pressing said cylindrical filter from the top thereof so as to prevent expansion of the spiral spacing of the cylindrical filter during rotational driving of said cylinder by said motor, said filter pressing means being removably coupled to said centrifugal separator cylinder so that said cylindrical filter can be taken out from aid centrifugal separator cylinder when said filter pressing means is not coupled to said centrifugal separator cylinder; and
   rotation preventing means for preventing a relative rotation between said cylindrical filter and said centrifugal separator cylinder when said centrifugal separator cylinder is, at least, normally rotated by said motor.

2. A juice extractor in accordance with claim 1, wherein
said filter pressing means is integrally connected to said cylindrical filter in the uppermost portion thereof.

3. A juice extractor in accordance with claim 2, which further comprises a handle disposed on an upper end of said filter, said handle being movable between a laying position and a standing position.

4. A juice extractor in accordance with claim 1, wherein
said centrifugal separator cylinder has an opening in its upper end and a bottom in its lower end.

5. A juice extractor in accordance with claim 1, wherein
said filter pressing means is structured by an annular member.

6. A juice extractor in accordance with claim 5, wherein
an inner diameter of said annular member is smaller than an inner diamter of the upper end of said cylindrical filter.

7. A juice extractor in accordance with claim 1, wherein
said cylindrical filter is symmetrical with respect to a centerline perpendicular to an axial line of the filter.

8. A juice extractor in accordance with claim 1, wherein
said cylindrical filter is symmetrical with respect to a centerline perpendicular to an axial line of the filter, except that
said symmetrical structure is adapted such that the internal peripheral surface of said cylindrical filter is tapered, with the inside diameter becoming larger toward the top and bottom of the filter with respect to said centerline.

9. A juice extractor in accordance with claim 1, wherein
the internal peripheral surface of said cylindrical filter is formed such that the inside diameter of said filter becomes larger toward the bottom.

10. A juice extractor in accordance with claim 1, wherein
said rotation preventing means includes concave and convex engagement between an outer periphery of said cylindrical filter and an internal periphery of said centrifugal separator cylinder.

11. A juice extractor in accordance with claim 1, wherein
said rotation preventing means includes a concave and convex engagement between said filter pressing means and the uppermost portion of said cylindrical filter.

12. A juice extractor in accordance with claim 1, wherein
said filter pressing means is detachably mounted in said centrifugal separator cylinder by concave and convex engagement between the outer peripheral surface of said filter pressing means and the internal peripheral surface of said centrifugal separator cylinder.

13. A juice extractor in accordance with claim 3, wherein
said filter pressing means is detachably mounted in said centrifugal separator cylinder by concave and convex engagement between the outer peripheral surface of said filter pressing means and the internal peripheral surface of said centrifugal separator cylinder.

14. A juice extractor in accordance with claim 12, wherein
said concave sand convex engagement includes projections provided in one of the outer peripheral surface of said filter pressing means and the internal peripheral surface of said centrifugal separator cylinder, and grooves provided in the one of said surfaces not having said projections.

15. A juice extractor in accordance with claim 13, wherein
said concave and convex engagement includes projections provided in one of the outer peripheral surface of said filter pressing means and the internal peripheral surface of said centrifugal separator cylinder, and grooves provided in the one of said surfaces not having said projections.

16. A juice extractor in accordance with claim 14, wherein
said grooves have a vertical portion having an opening to an exterior and a horizontal portion communicating with one end of said vertical portion and extending in a horizontal direction, said opening being adapted such that said projection is insertable in said vertical portion, and said horizontal portion being adapted such that said projection is movable to a horizontal direction.

17. A juice extractor in accordance with claim 15, wherein
said grooves have a vertical portion having an opening to an exterior in the upper end thereof and a horizontal portion communicating with a lower portion of said vertical portion and extending in a horizontal direction, said opening being adapted such that said projection is insertable and the size of said horizontal portion being adapted such that said projection is movable to a vertical direction.

18. A juice extractor in accordance with claim 14, which further comprises
restricting means provided in at least one of said centrifugal separator cylinder and said cylindrical filter for restricting rotation of said cylindrical filter in a direction in which said projection is disengaged with said grooves, with said projection being engaged with said grooves in upward and downward directions.

19. A juice extractor in accordance with claim 15, which further comprises
restricting means provided in at least one of said centrifugal separator cylinder and said cylindrical filter for restricting rotation of said cylindrical filter in direction in which said projection is disengaged with said grooves, with said projection being engaged with said grooves in upward and downward directions.

20. A juice extractor in accordance with claim 1, which further comprises
an inwardly projecting annular flange disposed in an internal periphery of the uppermost portion of said cylindrical filter.

21. A juice extractor in accordance with claim 1, wherein
there is a juice flowing gap between an outer peripheral surface of said cylindrical filter and said internal peripheral surface of said centrifugal separator cylinder.

22. A juice extractor in accordance with claim 21, wherein
said juice flowing gap is formed by raised portions provided in one of the outer peripheral surface of said cylindrical filter and the internal peripheral surface of said centrifugal separator cylinder.

23. A juice extractor in accordance with claim 1, wherein
said juice flowing gap is formed by a plurality of projections provided in one of an upper surface and a lower surface of portions of said spiral body.

24. A juice extractor in accordance with claim 1, which further comprises
lateral shift preventing means for preventing lateral shift in a rotational direction in each element of said spiral body.

25. A juice extractor in accordance with claim 24, wherein
said lateral shift preventing means includes an engagement of the projections provided in at least one of an upper surface and lower surface of adjacent elements of the spiral body and the grooves opposed to the projections.

26. A juice extractor in accordance with claim 1, wherein
end portion of at least one of said uppermost portion and lowest portion of said spiral body is formed as a projecting end and engages with the grooves provided in a butt surface of said spiral body.

27. A juice extractor in accordance with claim 19, wherein
said restricting means is integrally connected to the base of said handle.

* * * * *